United States Patent
Mimura et al.

(10) Patent No.: US 9,017,559 B2
(45) Date of Patent: Apr. 28, 2015

(54) WATER TREATMENT APPARATUS AND A METHOD FOR CLEANING A FILTER LAYER OF A WATER TREATMENT APPARATUS

(75) Inventors: Hitoshi Mimura, Izumiotsu (JP); Kiyokazu Mukai, Izumiotsu (JP)

(73) Assignee: Nagaoka International Corporation, Osaka (JP)

( * ) Notice: Subject to any disclaimer, the term of this patent is extended or adjusted under 35 U.S.C. 154(b) by 607 days.

(21) Appl. No.: 13/380,651

(22) PCT Filed: Jun. 15, 2010

(86) PCT No.: PCT/JP2010/060108
§ 371 (c)(1),
(2), (4) Date: Dec. 23, 2011

(87) PCT Pub. No.: WO2011/001819
PCT Pub. Date: Jan. 6, 2011

(65) Prior Publication Data
US 2012/0103917 A1    May 3, 2012

(30) Foreign Application Priority Data
Jun. 30, 2009    (JP) .................................. 2009-155435

(51) Int. Cl.
*B01D 24/46* (2006.01)
*C02F 1/72* (2006.01)
(Continued)

(52) U.S. Cl.
CPC . *C02F 1/34* (2013.01); *B01D 24/12* (2013.01); *B01D 24/14* (2013.01); *B01D 24/46* (2013.01); *C02F 1/74* (2013.01); *C02F 2303/14* (2013.01)

(58) Field of Classification Search
CPC ........ B01D 29/60; B01D 29/66; B01D 24/01; B01D 24/46; B01D 24/48; B01D 35/20; B01D 37/04; C02F 1/74

USPC .................................. 210/741, 739, 794, 151
See application file for complete search history.

(56) References Cited

U.S. PATENT DOCUMENTS

| 2,769,547 | A | 11/1956 | Adler |
| 4,013,556 | A | 3/1977 | Evans |

(Continued)

FOREIGN PATENT DOCUMENTS

| CA | 2610620 A1 | 5/2009 |
| EP | 0291716 A2 | 11/1988 |

(Continued)

OTHER PUBLICATIONS

Grigoraki, Erasmia, "Supplementary European Search Report," European Patent Office, Oct. 31, 2013.

(Continued)

*Primary Examiner* — Heidi Kelley
*Assistant Examiner* — Akash Varma
(74) *Attorney, Agent, or Firm* — Florek & Endres PLLC

(57) ABSTRACT

A water treatment apparatus including one or more mixed raw water stream jet nozzles, a filtering tank housing a filter layer disposed below the mixed raw water stream jet nozzle or nozzles, the filter layer having an upper layer and a lower layer, the upper layer containing a filter material with a smaller specific gravity and a larger particle diameter than a filter material of the lower layer, a water collecting and distributing pipe for removing water filtered through the filter layer and supplying reverse stream cleaning water to the filter layer during reverse cleaning, filter material vibrating means for vibrating a filter material of the upper layer including a vibrating element connected to a power source and vibration expanding element buried in the upper layer for transmitting vibration of the vibrating element, and an overflow outlet provided in the filtering tank above the filter layer.

15 Claims, 13 Drawing Sheets

(51) Int. Cl.
*B01D 37/04* (2006.01)
*B01D 35/20* (2006.01)
*B01D 24/48* (2006.01)
*C02F 1/34* (2006.01)
*B01D 24/12* (2006.01)
*B01D 24/14* (2006.01)
*C02F 1/74* (2006.01)

(56) References Cited

U.S. PATENT DOCUMENTS

| | | | |
|---|---|---|---|
| 4,547,286 A | 10/1985 | Hsiung | |
| 6,533,946 B2* | 3/2003 | Pullman | 210/787 |
| 6,942,807 B1* | 9/2005 | Meng et al. | 210/719 |
| 7,014,758 B2* | 3/2006 | Nagaoka | 210/209 |
| 8,110,116 B2* | 2/2012 | Mimura et al. | 210/792 |

FOREIGN PATENT DOCUMENTS

| | | |
|---|---|---|
| EP | 2135657 | 12/2009 |
| FR | 1052727 A | 1/1954 |
| FR | 2373319 A1 | 7/1978 |
| JP | 48-21258 | 3/1973 |
| JP | 9-65998 | 3/1997 |
| JP | 2001-179013 | 7/2001 |
| JP | 2002-126768 | 5/2002 |
| JP | 2004-66217 | 3/2004 |
| JP | 2010264334 A * | 11/2010 |
| WO | 0234677 A2 | 5/2002 |

OTHER PUBLICATIONS

International Search Report in PCT/JP2010/060108, Japanese Patent Office, Sep. 21, 2010.

Written Opinion in PCT/JP2010/060108, Japanese Patent Office, Sep. 21, 2010.

* cited by examiner

WATER TREATMENT APPARATUS AND A METHOD FOR CLEANING A FILTER LAYER OF A WATER TREATMENT APPARATUS

This application is a U.S. National Stage filing under 35 U.S.C. §371 of International Application No. PCT/JP2010/060108, filed Jun. 15, 2010, which in turn claims priority to Japanese Patent Application No. 2009-155435, filed Jun. 30, 2009.

TECHNICAL FIELD

This invention relates to a water treatment apparatus and, more particularly, to a water treatment apparatus which can oxidize iron, manganese and other substances dissolved in water such as underground water to turn them into substances which are insoluble in water with a simple and compact apparatus and without using a chemical such as an oxidizing agent or a coagulant. The invention relates also to a method for cleaning a filter layer of such water treatment apparatus.

BACKGROUND ART

Underground water is utilized as raw water for tap water and also utilized in industries which require a large quantity of water such as food, soft drink, beverage, dyestuff industries and also in public baths. In these industries, iron and manganese contents contained in underground water have raised a problem. While iron and manganese are substances which are necessary for a human body, contents of these substances exceeding a certain amount give a metal taste to water and turn water to red or black water, thereby making the water unsuitable for drinking and causing various difficulties in these industries. Further, in a foundation work in building industry, it is indispensable to remove underground water from a foundation site before the foundation work starts. If a large quantity of iron and manganese is contained in the underground water, the iron and manganese must be removed from the underground water before the underground water is discharged to the sewerage because it is legally prohibited to discharge such underground water the sewerage without any treatment.

In a currently prevailing conventional water treatment device for removing iron or manganese, an oxidizing agent such, for example, as sodium hypochlorite or a flocculant such, for example, as poly-aluminum chloride (PAC) is added to raw water to oxidize iron or manganese which is dissolved in the raw water and thereby convert it to iron oxide or manganese oxide which is insoluble in water and the iron oxide or manganese oxide is filtered out by filtering the raw water through filtering sand.

In the conventional water treatment device requiring addition of an oxidizing agent or a flocculant, however, a relatively large amount of oxidizing agent or flocculant is consumed in the device and, therefore, the cost of such oxidizing agent or flocculant is tremendous.

Further, since hypochlorous acid which is used as the oxidizing agent remains in water after the treatment for oxidizing iron and manganese, trihalomethane which is a carcinogen is generated and, for removing trihalomethane, the water must further be filtered through an activated carbon layer which adds to the cost of the water treatment. If provision of such activated carbon layer is omitted for economic reason, water after filtering must be constantly analyzed for preventing generation of trihalomethane caused by addition of an excessive amount of oxidizing agent and, if necessary, the amount of addition of the oxidizing agent must be adjusted. This method requires a high cost of maintenance in addition to the cost of purchasing the oxidizing agent.

Further, the conventional water treatment device generally is a complex and large-scale system including an aeration tank, a flocculation tank, a precipitation tank, a sand filter tower, an iron and manganese removing tower and a chemical agent tank and this system requires a large space for installation. It is impossible to install such a large device in a site of a limited space such in a town.

Furthermore, filtering sand which is used in this water treatment device requiring addition of an oxidizing agent is blocked by accumulated impurities and therefore must be replaced from time to time. The used sand to be abandoned must be treated as industrial waste because it contains a chemical agent and a place where it can be abandoned is extremely restricted by laws and regulations.

For eliminating the disadvantages of the prior art water treatment apparatus using a chemical and providing a water treatment apparatus which can oxidize iron, manganese and other elements dissolved in water such as underground water to make them insoluble in water with a simple and compact device and without using a chemical such as an oxidizing agent or a coagulant, Japanese Patent Application Laid-open Publication No. 2002-126768 discloses a water treatment apparatus in which raw water is jetted out by jet nozzles in which air is introduced through an air inlet or air inlet tube. A jet water stream including multitudes of air bubbles is blown out of the raw water jetting outlet and is struck against the water surface above the filter layer disposed below the raw water jetting outlet thereby causing vehement aeration both in the water above the filter layer and on the surface of the filter layer. By virtue of this aeration, soluble substances such as iron and manganese contained in the water are oxidized and thereby are turned to insoluble substances are caught on the surfaces of particles of the filter material such as filtering sand which constitutes the filter layer. Accordingly, dissolved substances such as iron and manganese in raw water can be turned to insoluble substances and filtered out with a simple and compact apparatus.

In the prior art water treatment apparatuses including one disclosed in the above described publication, iron which is made insoluble and deposited in the form of a film on the filter material tends to be removed excessively in the lower portion of the filter layer and removed insufficiently in the upper portion of the filter layer when the filter layer is cleaned with cleaning water. As to removal of iron and manganese, iron is turned to the state of film by oxidation in the upper portion of the filter layer whereas manganese is caught on the surface of the particle of the filter layer by the action of microorganism in the lower portion of the filter layer as will be described later. If, in a case where concentration of iron in raw water is significantly larger than concentration of manganese, the filter layer as a whole is cleaned with a large quantity of cleaning water for removing iron caught in the upper portion of the filter layer, microorganism living in the lower portion of the filter layer for catching manganese will be washed away and, as a result, catching of manganese in a subsequent water treatment operation will be obstructed.

On the other hand, it will be advantageous for a water treatment apparatus to increase filtering speed per unit time because, by doing so, the size and space required for the apparatus will be reduced. Particularly, space for establishing a water treatment apparatus is limited because a location at which such apparatus can be established is limited. In a case where a large scale water treatment apparatus cannot be established, necessary amount of raw water must be filtered with a small apparatus established in a narrow space and, in this case, it is necessary to increase the filtering speed of the apparatus.

An important factor necessary for increasing the filtering speed of the water treatment apparatus is efficiency of cleaning of the filter layer of the water treatment apparatus.

In a water treatment apparatus, as a filter operation is continued, the filter layer, particularly its surface portion, is covered with flocks of oxides such as iron oxide and other substances as time elapses and the filter function of the filter layer is reduced. In this case, the filter operation must be suspended temporarily and cleaning of the filter layer must be conducted. Accordingly, unless cleaning of the filter layer is conducted efficiently, increase in the filtering speed cannot be achieved.

In the water treatment apparatus described in the above described publication, the raw water supply tube is reciprocated in a plane parallel to the surface of the filter layer and the blocked filter layer is released from the blocked state by a jet water stream containing multitudes of air bubbles which is jetted out of the raw water supply tube to recover the filter function. Further, in this water treatment apparatus, a filter layer support made of a plate screen is provided in the bottom of the filter layer made of a single layer containing filtering sand and a reverse stream cleaning water supply tube for reverse stream cleaning the filter layer with reverse stream cleaning water is disposed below the filter layer support. When the upper portion of the filter layer, particularly its upper surface, has been covered with flocks of oxides and other substances, supply of raw water to the filtering tank is temporarily suspended and reverse stream cleaning water is caused to flow upwardly from the filter layer support to the entire filter layer to remove the substances covering the upper portion of the filter layer and wash away iron and manganese caught by the filter layer from an overflow outlet to the outside.

The filtering speed of this water treatment apparatus is 60 m/day to 130 m/day. In a case where it is necessary to increase the filtering speed of filter operation, cleaning of the filter layer must also be made more frequently and burden to treatment imposed by microorganism in the lower portion of the filter layer also increases. Therefore, efficiency of cleaning of the filter layer by this water treatment apparatus is limited to the above described filtering speed and a higher filtering speed cannot be achieved.

The prior art water treatment apparatus including one described in the above described publication must consume about 10% to 15% of received water (filtered water) for the above described cleaning operation with the result that efficiency of water treatment is significantly reduced.

The above described prior art water treatment apparatus has a mechanism for reciprocating the raw water supply tube in a plane parallel to the surface of the filter layer for cleaning the surface of the filter layer. Since this mechanism must reciprocate the raw water supply tube with an electric motor, a large power is required for cleaning the surface of the filter layer and a complex mechanism for reciprocation of the raw water supply tube. Further, this water treatment apparatus requires much labor and cost for maintenance of the apparatus including compensation for wear of rails for reciprocating the raw water supply tube and wear of a hose for supplying raw water to the raw water supply tube. Furthermore, for moving the raw water supply tube in which the cleaning nozzles are disposed in a line, the filtering tank must have a rectangular configuration with resulting increase in the size of the apparatus. Thus, it is difficult to make a compact design of the apparatus even in case the apparatus must be established in a narrow space.

Further, in the prior art water treatment apparatus in which cleaning of the filter layer is made by reciprocating the cleaning nozzles, the surface of the filter layer other than areas where the cleaning nozzles pass over remains uncleaned and hence it takes much time to complete cleaning of the entire surface of the filter layer resulting in difficulty in achieving a high speed cleaning of the filter layer.

It is, therefore, an object of the invention to provide a novel method for cleaning a water treatment apparatus capable of filtering water at a higher speed than the prior art water treatment apparatus and a water treatment apparatus which enables application of such method.

Since in the prior art water treatment apparatus, cleaning is made by reciprocating the raw water supply tube, cleaning on the surface of the filter layer other than an area where the raw water supply tube passes is not made and therefore considerable time is required before necessary cleaning is completed which poses a limit to a high speed treatment. It is therefore another object of the invention to improve this point.

It is another object of the invention to provide a water treatment apparatus which has an improved filtering efficiency by reducing the ratio of amount of cleaning water to the amount of filtered water and which does not require a large power and can be made in a simple, compact design requiring only a simple maintenance and a method for cleaning this water treatment apparatus.

SUMMARY OF THE INVENTION

Studies and experiments made by the inventors of the present invention for achieving the above objects of the invention have resulted in the finding, which has led to the present invention, that, in view of the fact that a major part of iron to be caught by a water treatment apparatus settles in the upper portion of the filter layer while a major part of manganese settles in the lower portion of the filter layer and that concentrations of iron and manganese in raw water are not equal but concentration of iron is normally much higher than concentration of manganese, a cleaning effect of removing iron in the upper portion of the filter layer can be remarkably improved by cleaning the filter layer in such a manner that a filter material of a filter layer is vibrated by filter material vibrating means. The inventors have also found that the cleaning effect can be remarkably improved by removing iron by a partial cleaning process and removing manganese by a whole cleaning process whereby a high speed filtering which has not been achieved in the prior art water treatment apparatus can be realized and the amount of cleaning water can be significantly saved.

For achieving the above described objects of the invention, in the first aspect of the invention, there is provided a method for cleaning a filter layer of a water treatment apparatus comprising a raw water supply tube, one or a plurality of mixed raw water stream jet nozzles each communicating at one end thereof with the raw water supply tube and having at the other end thereof a raw water outlet from which mixed stream of raw water and air is jetted out, a filtering tank housing a filter layer disposed below the mixed raw water stream jet nozzle or nozzles with a predetermined distance between the surface of the filter layer and the raw water outlet of the mixed raw water stream jet nozzle or nozzles, a filtered water takeout tube provided in the filtering tank for taking out water filtered through the filter layer, a reverse stream cleaning water supply tube provided in the filtering tank for supplying reverse stream cleaning water to the filter layer, a filter material vibrating means for vibrating a filter material of the filter layer, said filter material vibrating means having a portion which is buried in the filter layer, and an overflow outlet provided in the filtering tank above the filter layer, characterized in that the filter layer is cleaned by vibrating the filter material of the filter layer while causing the reverse stream cleaning water to flow from the reverse stream cleaning water supply tube.

In the second aspect of the invention, there is provided a method for cleaning a filter layer of a water treatment apparatus comprising a raw water supply tube, one or a plurality of mixed raw water stream jet nozzles each communicating at one end thereof with the raw water supply tube and having at the other end thereof a raw water outlet from which mixed stream of raw water and air is jetted out, a filtering tank housing a filter layer disposed below the mixed raw water stream jet nozzle or nozzles with a predetermined distance between the surface of the filter layer and the raw water outlet of the mixed raw water stream jet nozzle or nozzles, said filter layer consisting of an upper layer and a lower layer and said upper layer comprising a filter material which has a smaller specific gravity and a larger particle diameter than a filter material of said lower layer, a filtered water takeout tube provided in the filtering tank for taking out water filtered through the filter layer, a reverse stream cleaning water supply tube provided in the filtering tank for supplying reverse stream cleaning water to the filter layer, filter material vibrating means for vibrating a filter material of the upper layer, said filter material vibrating means having a portion which is buried in the upper layer, and an overflow outlet provided in the filtering tank above the filter layer, characterized in that the filter layer is cleaned by selectively carrying out a partial cleaning process by which the upper layer is mainly cleaned and a whole cleaning process by which both the upper layer and the lower layer are cleaned wherein said partial cleaning process comprises:

(a) a filter operation interrupting step of suspending supply of raw water;

(b) an upper layer cleaning step of causing reverse stream cleaning water to flow from the reverse stream cleaning water supply tube as un upward directed stream at an upper layer cleaning speed and vibrate the filter material of the upper layer to cause the filter material to rub together, thereby removing from the filter material iron hydroxide which has closed the surface of the filter material and washing away the removed iron hydroxide by the upward directed reverse stream; and (c) a turbid water draining step of draining turbid water containing substances separated from the filter material of the upper layer from the overflow outlet by continuing supply of the upward directed reverse stream at the upper layer cleaning speed, and said whole cleaning process comprises:

(a) a filter operation interrupting step of suspending supply of raw water;

(b) a cleaning step of causing reverse stream cleaning water to flow from the reverse stream cleaning water supply tube at a whole layer cleaning speed which is higher than the upper layer cleaning speed and is higher than a speed at which the filter material settles while actuating the filter material vibrating means to clean the filter material of the upper layer and the lower layer;

(c) a settling step of finishing cleaning of the filter material of the upper layer and the lower layer and thereby allowing the filter material of the upper layer and the lower layer to settle while continuing supply of the upward directed reverse stream at a speed which is lower than a speed at which the filter material settles; and (d) a turbid water draining step of draining turbid water containing substances separated from the filter material of the upper layer and the lower layer from the overflow outlet by continuing supply of the upward directed reverse stream at the upper layer cleaning speed.

In the third aspect of the invention, there is provided a method as defined in the first or second aspects further comprising a step of measuring resistance value of the filtering tank during a normal filter operation and automatically starting the partial cleaning process when the resistance value has exceeded a predetermined value.

In the fourth aspect of the invention, there is provided a method as defined in the second aspect further comprising a step of measuring resistance value of the filtering tank during a normal filter operation and starting the partial cleaning process when the resistance value has exceeded a predetermined value and, when time elapsed from finishing of the partial cleaning process till a time point at which the resistance value of the filtering tank has reached a predetermined value becomes less than a predetermined period of time, automatically starting the whole cleaning process.

In the fifth aspect of the invention, there is provided a water treatment apparatus comprising a raw water supply tube, one or a plurality of mixed raw water stream jet nozzles each communicating at one end thereof with the raw water supply tube and having at the other end thereof a raw water outlet from which mixed stream of raw water and air is jetted out, a filtering tank housing a filter layer disposed below the mixed raw water stream jet nozzle or nozzles with a predetermined distance between the surface of the filter layer and the raw water outlet of the mixed raw water stream jet nozzle or nozzles, a filtered water takeout tube provided in the filtering tank for taking out water filtered through the filter layer, a reverse stream cleaning water supply tube provided in the filtering tank for supplying reverse stream cleaning water to the filter layer, filter material vibrating means for vibrating filter material of the filter layer, said filter material vibrating means having a portion which is buried in the filter layer, and an overflow outlet provided in the filtering tank above the filter layer.

In the sixth aspect of the invention, there is provided a water treatment apparatus as defined in the fifth aspect further comprising means for supplying additional dissolved oxygen to the filter layer.

In the seventh aspect of the invention, there is provided a water treatment apparatus comprising a raw water supply tube, one or a plurality of mixed raw water stream jet nozzles each communicating at one end thereof with the raw water supply tube and having at the other end thereof a raw water outlet from which mixed stream of raw water and air is jetted out, a filtering tank housing a filter layer disposed below the mixed raw water stream jet nozzle or nozzles with a predetermined distance between the surface of the filter layer and the raw water outlet of the mixed raw water stream jet nozzle or nozzles, said filter layer consisting of an upper layer and a lower layer and said upper layer comprising a filter material which has a smaller specific gravity and a larger particle diameter than a filter material of said lower layer, a filtered water takeout tube provided in the filtering tank for taking out water filtered through the filter layer, a reverse stream cleaning water supply tube provided in the filtering tank for supplying reverse stream cleaning water to the filter layer, filter material vibrating means for vibrating a filter material of the upper layer, said filter material vibrating means having a portion which is buried in the upper layer, and an overflow outlet provided in the filtering tank above the filter layer.

In the eighth aspect of the invention, there is provided a water treatment apparatus as defined in the seventh aspect further comprising a posterior stage filtering tank provided downstream of the filtered water takeout tube as viewed in the direction of taking out filtered water and housing a posterior stage filter layer comprising a filter material which is the same material as the filter material of the lower layer, said posterior stage filtering tank comprising a filtered water outlet or outlets communicating with the filtered water takeout tube and opening in an upper portion of the posterior stage filtering tank, a filtered water takeout tube for taking out water filtered through the posterior filter layer, a reverse stream cleaning water supply tube for supplying reverse stream cleaning water to the posterior filter layer, and an overflow outlet provided in the posterior filtering tank above the posterior filter layer.

In the ninth aspect of the invention, there is provided a water treatment apparatus as defined in any of the fifth to eighth aspects wherein the filtered water takeout tube and the reverse stream cleaning water supply tube respectively consist of a plurality of water collecting and distributing pipes disposed in parallel in a bottom portion of the filtering tank and each of the water collecting and distributing pipes consists of an outer cylindrical screen and an inner perforated pipe, said inner perforated pipe having water collecting and distributing holes formed in the axial direction of the inner perforated pipe on both sides thereof.

In the tenth aspect of the invention, there is provided a water treatment apparatus as defined in any of the fifth to eighth aspects wherein said filter material vibrating means comprises one or a plurality of vibrating elements connected to a power source, and vibration expanding means connected to said vibrating element or elements in such a manner that said vibration expanding means is buried in the filter material for transmitting vibration of the vibrating element or elements to the filter material of the filter layer.

In the eleventh aspect of the invention, there is provided a water treatment apparatus as defined in the tenth aspect wherein said vibration expanding means comprises a frame connected to the vibrating element and a plurality of vibration expanding element fixed to the frame, and wherein each of said vibration expanding elements comprises a support bar which extends vertically in the filter layer and is fixed at the upper end thereof to the frame, a plurality of first vibration transmitting plates which are fixed to the support bar in such a manner that the first vibration transmitting plates are disposed in parallel to one another with a predetermined interval in the vertical direction of the filter layer, and a plurality of second vibration transmitting plates which are fixed to the support bar in the interval of the first vibration transmitting plates in such a manner that the second vibration transmitting plates cross the first vibration transmitting plates and are disposed in parallel to one another.

In the twelfth aspect of the invention, there is provided a water treatment apparatus as defined in the eleventh aspect wherein a plurality of the vibration expanding elements are disposed in such a manner that a substantially square filter surface in a plan view is formed with adjacent two of the vibration expanding elements.

In the thirteenth aspect of the invention, there is provided a water treatment apparatus as defined in the eleventh aspect wherein a plurality of the vibration expanding elements are disposed in such a manner that a substantially rectangular filter surface in a plan view is formed with adjacent two of the vibration expanding elements.

Advantageous Results of the Invention

According to the first aspect of the invention, the filter layer is cleaned by vibrating a filter material as a whole of the filter layer strongly by the vibrating means having a portion buried in the filter layer for vibrating each particle of the filter material of the filter layer. Therefore, the filter material of the filter layer is continuously and incessantly caused to rub together and thereby is cleaned during vibration of the filter material by the vibrating means. Therefore, the cleaning efficiency per unit time is significantly improved and a high speed filtering can be achieved compared with the prior art water treatment apparatus of the reciprocating cleaning nozzle type by which the filter material is stirred only when the cleaning nozzles pass over the filter material. Further, since this method does not require a large power and a complex mechanism as in the prior art water treatment apparatus of the reciprocating cleaning nozzle type, the manufacturing cost of the apparatus can be saved and the filtering tank can be made in a circular design as viewed in a plan view and, therefore, a water treatment apparatus of a simple, compact design which can be maintained easily can be provided.

According to the second aspect of the invention, the filter layer consists of an upper layer and a lower layer in which the upper layer has a filter material having a smaller specific gravity and a larger particle diameter than the lower layer and a partial cleaning process and a whole cleaning process are carried out. Iron which has a high concentration and is caught in the upper layer can be removed by frequently carrying out the partial cleaning process of the upper layer which is a combination of cleaning by vibration of the filter material particles by the vibrating means and cleaning by the upward reverse stream of a relatively moderate speed whereas manganese which has a low concentration and is caught in the lower layer can be removed with iron by carrying out the whole cleaning process by the upward reverse stream of a high speed at a frequency smaller than the frequency of the partial cleaning process. Accordingly, iron which has a high concentration and tends to be accumulated in a large amount in the upper layer can be sufficiently removed by the frequent partial cleaning process while manganese which has a low concentration and tends to be accumulated in a small amount in the lower layer can be sufficiently removed by less frequent whole cleaning process. Thus, the activity of the microorganism in the lower layer is not likely to be hindered by a frequent cleaning and the highest cleaning effect can be achieved through the entire filter layer and a necessary high speed filtering can be achieved. According to the invention, as compared to the filtering speed of 60 m/day to 120 m/day of the water treatment apparatus of the above publication, a remarkably higher filtering speed of 400 m/day can be achieved. Further, it is not necessary to frequently carry out the whole cleaning process which requires a large amount of reverse cleaning water for removing iron and, as a result, the amount of water used for cleaning can be saved as a whole. In the prior art apparatus using an oxidizing agent or flocculant, about 10% to 15% of filtered water was used for cleaning whereas in the apparatus of the present invention, the amount of cleaning water can be reduced to about 3% to 5% of received water.

Further, according to the invention, since the upper layer which is more frequently cleaned consists of a filter material which has a relatively small specific gravity and a relatively large particle diameter, the filter material is stirred and lifted upwardly during cleaning of the upper layer whereby the cleaning effect is increased and the amount of cleaning water used for cleaning can be held at the minimum. On the other hand, since the lower layer consists of a filter material which has a relatively large specific gravity and a relatively small particle diameter (fine), it has a larger specific surface area per unit volume and therefore has a higher microorganism treatment capacity. In the whole cleaning process, both the filter material of the upper layer and the filter material of the lower layer are stirred and mixed together but, since the filter material of the lower layer has a larger specific gravity than the filter material of the upper layer, the filter material of the lower layer has a higher settling speed than the filter material of the upper layer and settles at the lower layer before the filter material of the upper layer settles and then the filter material of the upper layer settles upon the filter material of the lower layer. Thus, the original state of the upper layer and the lower layer is restored. By combining the filter material of the upper layer which has a high cleaning capacity and the filter material of the lower layer which has a high microorganism treatment capacity, iron, manganese and other substances (impurities) contained in raw water can be caught sufficiently while the highest cleaning efficiency can be achieved. Moreover, since the upper layer consists of filter material having a relatively large particle diameter, resistance to water is relatively small and hence a high speed filtering can be achieved.

According to the third aspect of the invention, by measuring resistance value of the filtering tank during a normal filter operation and automatically starting the partial cleaning process when the resistance value has exceeded a predetermined value, when blocking of the filter material has occurred in the upper layer to a degree at which cleaning is necessary, the partial cleaning can be automatically started whereby the partial cleaning process can be carried out more efficiently than in a case where the partial cleaning process is carried out according to a preset schedule.

According to the fourth aspect of the invention, by measuring resistance value of the filtering tank during a normal filter operation and starting the partial cleaning process when the resistance value has reached a predetermined value and, when time elapsed from finishing of the partial cleaning process till a time point at which the resistance value of the filtering tank has reached the predetermined value becomes less than a predetermined period of time, automatically starting the whole cleaning process, the whole cleaning process can be started automatically and the filter layer can be maintained always in a desirable state by only measuring resistance value of the filtering tank.

According to the fifth aspect of the invention, there can be provided a water treatment apparatus which can perform the advantageous result of the first aspect of the invention.

According to the sixth aspect of the invention, when raw water contains ammoniac nitrogen in a high concentration, by supplying additional dissolved oxygen to the filter layer, the ammoniac nitrogen can be oxidized with this additional dissolved oxygen and thereby removed from the raw water.

According to the seventh aspect of the invention, there can be provided a water treatment apparatus which can perform the advantageous result of the second aspect of the invention.

According to the eighth aspect of the invention, there can be provided a water treatment apparatus which can perform the advantageous result of the third aspect of the invention.

According to the ninth aspect of the invention, by disposing the water collecting and distributing pipes disposed in a bottom portion of the filtering tank, each of the water collecting and distributing pipes consisting of a cylindrical screen and an inner perforated pipe, even in a case where concentration of manganese in raw water is high, manganese is deposited only on the surface of the cylindrical screen of the water collection and distributing pipe and, therefore, the perforated pipe only is taken out and the screen is directly washed from the inside of the cylindrical screen whereby cleaning of the bottom portion of the filtering tank can be finished with relatively a simple work.

According to the tenth aspect of the invention, the filter material vibrating means comprises one or a plurality of vibrating elements connected to a power source, and vibration expanding means connected to the vibrating element or elements in such a manner that said vibration expanding means is buried in the filter material for transmitting vibration of the vibrating element or elements to the filter material of the filter layer and, therefore, even if the number of the vibrating elements connected to the power source is small, desired degree of vibration can be transmitted to the entire filter material in the filter layer to vibrate each particle of the filter material whereby power such as electricity can be substantially saved and thereby saving of energy in the water treatment work can be achieved as compared to a case where the entire filter material is vibrated by only the vibrating elements connected to the power source without using the vibration expanding means.

According to the eleventh aspect of the invention, a plurality of first vibration transmitting plates and a plurality of second vibrating transmitting plates of the vibration expanding element are respectively provided with a predetermined interval between the respective vibration transmitting plates in the vertical direction and, therefore, water to be treated can flow freely in lateral direction through these intervals during the filtering operation whereby occurrence of deviation in the flow can be prevented and uniform filtering can be achieved.

According to the twelfth aspect of the invention, a plurality of the vibration expanding elements are disposed in such a manner that a substantially square filter surface in a plan view is formed with adjacent two of the vibration expanding elements and, therefore, the area of the square can be made smaller than in a case where square a filter surface in a plan view is formed with adjacent four of the vibration expanding elements whereby the furthest distance between a filter material in the square and the vibration transmitting plates can be made shorter.

According to the thirteenth aspect of the invention, a plurality of the vibration expanding elements are disposed in such a manner that a substantially rectangular filter surface in a plan view is formed with adjacent two of the vibration expanding elements and, therefore, the furthest distance between a filter material in the rectangular filter surface and the vibration transmitting plates can be made shorter as compared to other arrangement of the vibration expanding elements.

BRIEF DESCRIPTION OF THE DRAWINGS

In the accompanying drawings,

FIG. 12 shows a modified example of the water collecting and distributing pipes in which

DESCRIPTION OF PREFERRED EMBODIMENTS

Preferred embodiments of the invention will now be described with reference to the accompanying drawings.

The present invention can be applied not only to a water treatment apparatus comprising two filter layers of an upper layer and a lower layer but also to a water treatment apparatus comprising a single filter layer. In the following description, description will be made about a preferred embodiment of a water treatment apparatus having two filter layers of an upper layer and a lower layer.

Figure 1:
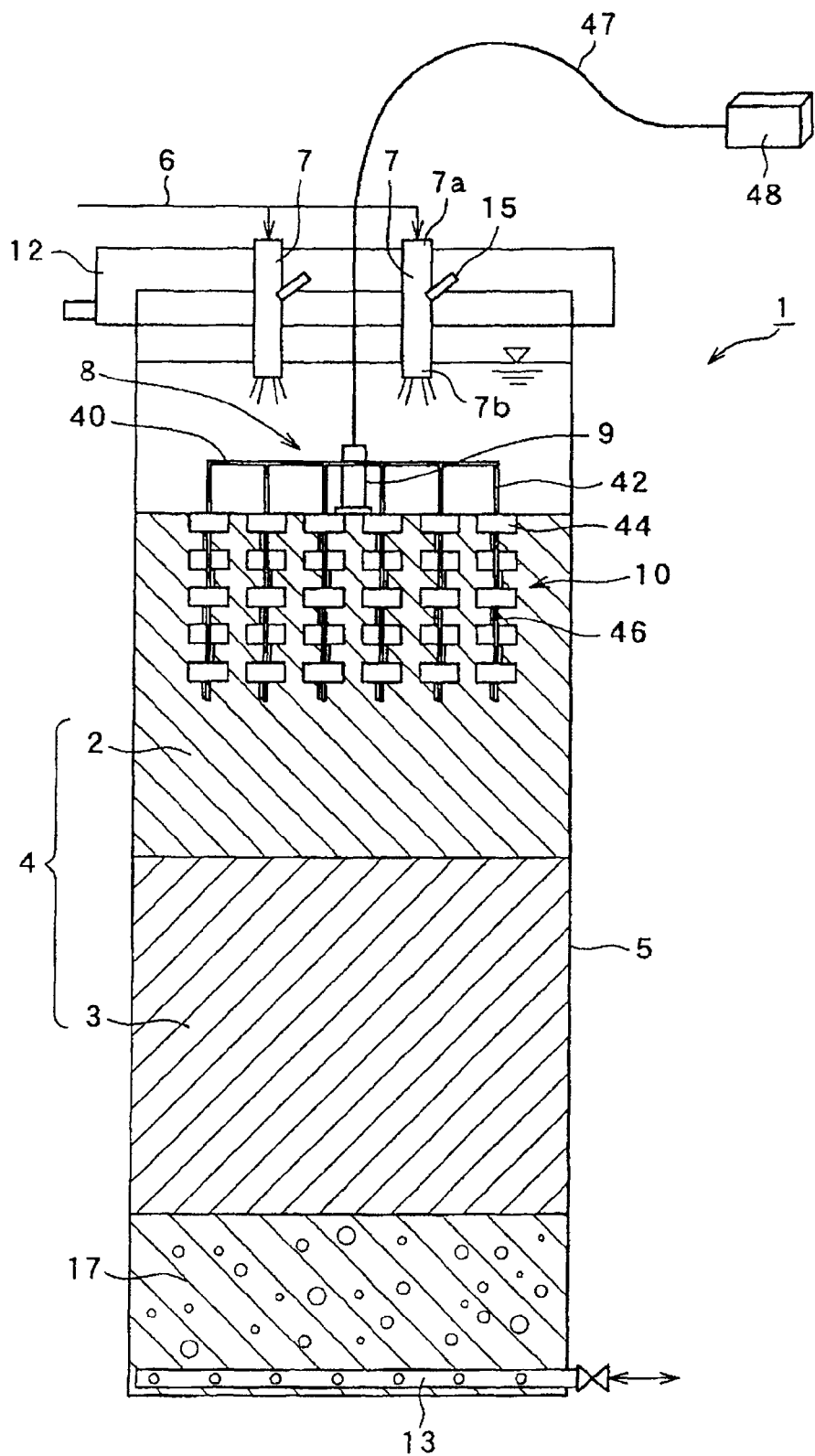
FIG. 1 is a schematic sectional view of an embodiment of the water treatment apparatus according to the invention.
Figure 2:
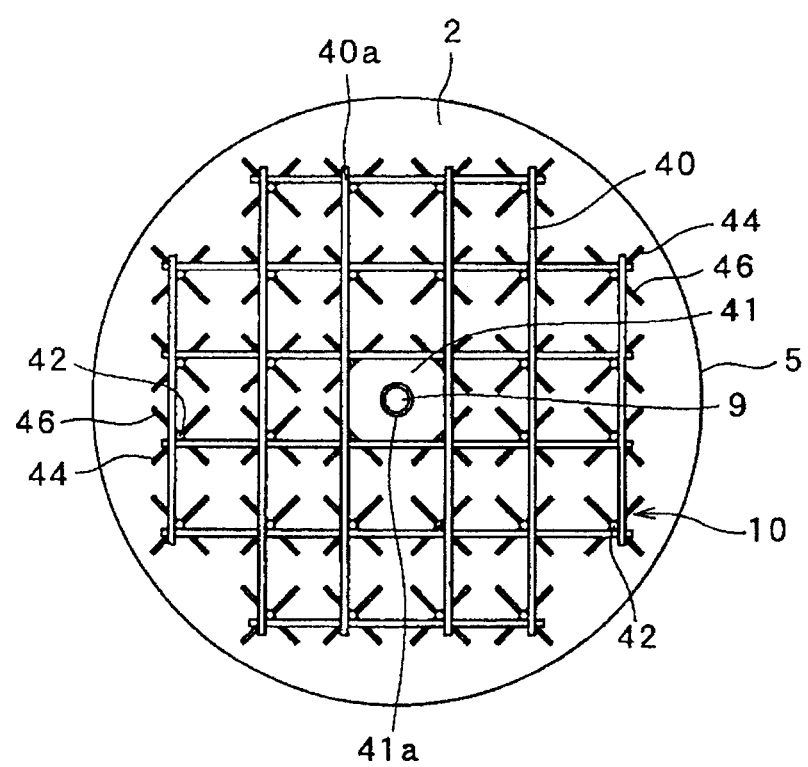
FIG. 2 is a plan view showing an example of the filter material vibrating means.

FIG. 1 is a diagram showing schematically an embodiment of the water treatment apparatus of the invention. FIG. 2 is a diagram showing schematically another embodiment of the water treatment apparatus.

In FIG. 1, a water treatment apparatus 1 comprises, as main component elements, a filtering tank 5 housing a filter layer 4 consisting of an upper layer 2 and a lower layer 3, a raw water supply tube 6, mixed raw water stream jet nozzles 7, an upper layer filter material vibrating means 8, an overflow outlet comprising a trough or hole 12 and a water collecting and distributing pipe 13 which is used concurrently as a filtered water takeout tube and a reverse stream cleaning water supply tube.

The raw water supply tube 6 made of a steel tube for supplying raw water such as underground water to be filtered to the filtering tank 5 is connected to a water supply pump (not shown) and this water supply pump is supplied with raw water from a raw water source through a water tank (not shown) which is provided if necessary and supplies the raw water to the raw water supply tube 6 at a predetermined flow speed.

The raw water supply tube 6 is provided above the top of the filtering tank 5 in a plane parallel to the surface of the filter layer 4.

One or a plurality (two in the illustrated embodiment) of mixed raw water stream jet nozzles 7 are provided in a manner to branch off vertically from the raw water supply tube 6. The upstream end portion 7a of each jet nozzle 7 is fitted in the raw water supply tube 6 to communicate with the raw water supply tube 6 and the downstream end portion 7b constitutes a raw water outlet from which the raw water is jetted out. A preferable inner diameter of the mixed raw water stream jet nozzle 7 is, for example, within a range from about 3 mm to 30 mm.

In the mixed raw water stream jet nozzles 7, the same number (two in the illustrated embodiment) of air inlet tubes 15 are provided. The upstream end portion of each air inlet tube 15 projects obliquely upwardly from the mixed raw water stream jet nozzle 7 to open to the atmosphere and the downstream end portion of the air inlet tube 15 opens in the mixed raw water stream jet nozzle 7 in a portion upstream of the raw water outlet 7b. A preferable inner diameter of the air inlet tube 15 is, for example, in the range from about 1 mm to 10 mm. The upstream end portion of the air inlet tube 15 is not limited to open to the atmosphere but it may be supplied with pure oxygen.

In the filtering tank 5, the upper layer 2 of the filter layer 4 is disposed below the mixed raw water stream jet nozzles 7 with a predetermined distance between the surface of the upper layer 2 and the raw water outlets 7b of the nozzles 7. It is necessary that the filter material filled in the upper layer 2 of the filter layer 4 should have a specific gravity which is smaller than the specific gravity of the filter material filled in the lower layer 3 and have a particle diameter which is larger than the particle diameter of the filter material filled in the lower layer 3. It has been found that, as a filter material of the upper layer satisfying these conditions, zeolite, for example, is a preferable material and particularly, zeolite having a particle diameter of about 1.2 mm is preferable. As a filter material of the lower layer satisfying these conditions, filtering sand having a particle diameter of about 0.6 mm is preferable. The filter layer 4 performs the function of filtering raw water by catching oxide flocks and other substances in raw water supplied from the jet nozzles 7 as jet streams and also performs the function of oxidizing and adsorbing iron and adsorbing manganese by the action of microorganism such as iron bacteria which lives in the filter layer. More specifically, iron is mainly adsorbed in the form of a film to the filter material in the surface portion of the upper layer 2 by auto-catalytic reaction of iron oxihydroxide (mostly in a portion about 200 mm deep from the surface of the filter layer) whereas manganese is mainly adsorbed on the surface of particles of the filtering sand by the action of microorganism in the lower layer 3 (mostly in a portion about 500 mm to 800 mm deep from the surface of the filter layer).

The filter layer 4 is supported by the gravel layer 17. The gravel layer 17 is preferably made of a layer of gravel of a small diameter, a layer of gravel of a medium diameter and a layer of gravel of a large diameter downwardly from the above but is not limited to this structure.

Figure 16:
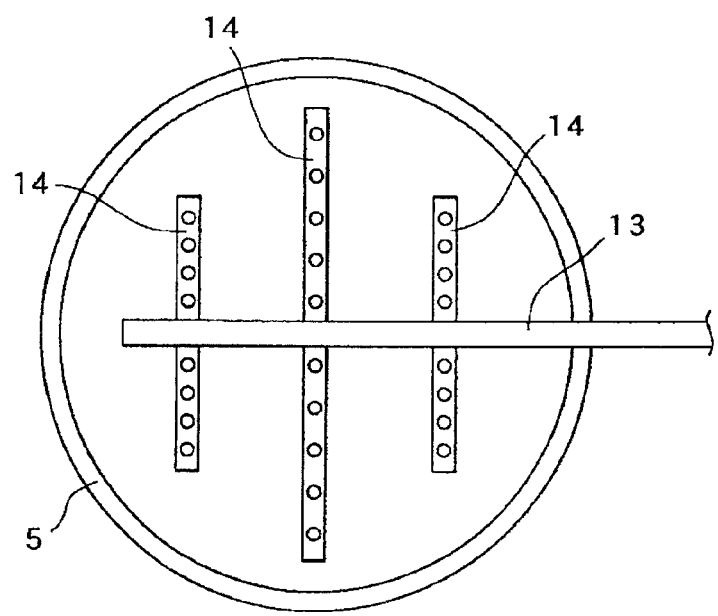
FIG. 16 is a sectional plan view showing arrangement of the water collecting and distributing pipe in a support gravel layer.

In the central portion of the gravel layer 17 of the filtering tank 5, a water collecting and distributing pipe 13 is disposed in a parallel direction. In the present embodiment, the water collecting and distributing pipe 13 is used concurrently as a filtered water takeout tube for taking out water filtered through the filter layer 4 and a reverse stream cleaning water supply tube for supplying reverse stream cleaning water to the filter layer 4. As shown in FIG. 16, a plurality of brach tubes 14 are connected to the water collecting and distributing pipe 13 in a manner to branch off from the pipe 13 in communication with the pipe 13 and extending in parallel to the pipe 13. The structure of the filtered out takeout tube and the reverse stream cleaning water supply tube is not limited to this but a filtered water takeout tube and a reverse stream cleaning water may be provided separately from each other.

In a portion of the filtering tank 5 above the surface of the upper layer 2, there is provided an overflow outlet 12 such as an overflow trough or hole 12 for draining overflow water during reverse stream cleaning. For draining overflow water during the reverse stream cleaning, not only a trough or hole but other shape of outlet means may be used.

In the embodiment of FIG. 1, a filter material vibrating means 8 comprises one or a plurality (one in the illustrated example) of vibrating elements 9 connected to a power source such as an ac power source and vibration expanding means connected to the vibrating element or elements 9 in such a manner that the vibration expanding means is buried in the filter material for transmitting vibration of the vibrating element or elements to the filter material of the upper layer 2. The vibration expanding means has a frame 40 and a plurality of vibration expanding elements 10 which are fixedly connected to the frame 40.

As the vibrating element 9, a vibrating element in the shape of a bar which is known as a concrete vibrator may be used. This vibrating element 9 is connected to a controller 48 via a cable 47 and this controller 48 is connected to the ac power source.

The frame 40 of the vibration expanding means is made of plurality of crossing steel bars arranged in the form of a net with each crossing points of these steel bars being welded. The frame 40 is disposed in parallel to the upper surface of the upper layer 2 with an interval of 5 cm to 10 cm from the upper surface of the upper layer 2. In the central portion of the frame 40, as shown in FIG. 2, a vibrating element mounting plate 41 is fitted in the space defined by the crossing steel bars and welded to the surrounding steel bars. In a mounting hole 41a formed in the central portion of the vibrating element mounting plate 41 is fitted the vibrating element 9 in such a manner that the vibrating element 9 is in close contact with the inner wall of the mounting hole 41a. A plurality of the vibration expanding elements 10 are attached to each crossing point 40a of the frame 40. Each vibration expanding element 10 comprises a support bar 42 which is made of steel and extends vertically in the filter layer and is fixed at the upper end thereof to the frame 40, a plurality of (five in the illustrated example of FIG. 3) first vibration transmitting plates 44 which are made of steel, are of a laterally long rectangular shape and are welded to the support bar 42 in such a manner that the first vibration transmitting plates 44 are disposed in parallel to one another with a predetermined interval in the vertical direction of the filter layer, and a plurality of (five in the illustrated example of FIG. 3) second vibration transmitting plates 46 which are made of steel, are of a laterally long rectangular shape, and are fixed to the support bar 42 in the interval of the first vibration transmitting plates 44 in such a manner that the second vibration transmitting plates 46 cross the first vibration transmitting plates 44 and are disposed in parallel to one another.

Figure 3:
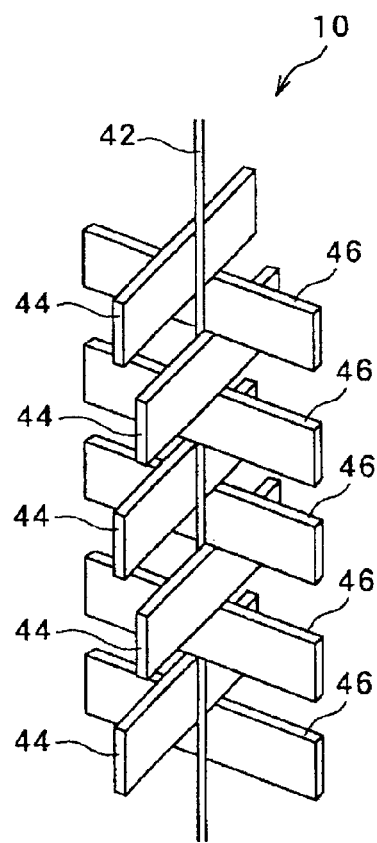
FIG. 3 is a perspective view showing an example the vibration expanding element used in the embodiment of FIG. 1.
Figure 4:
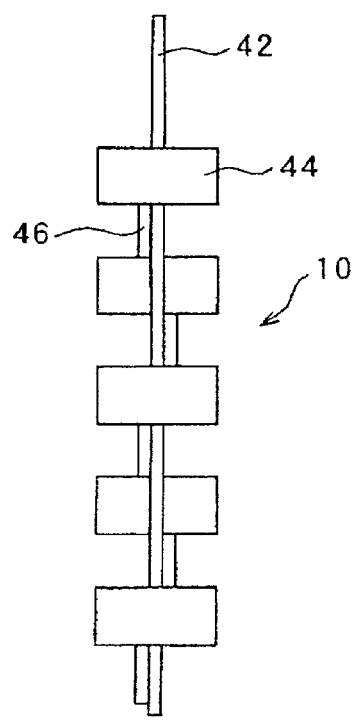
FIG. 4 is a front view of the vibration expanding element.
Figure 5:
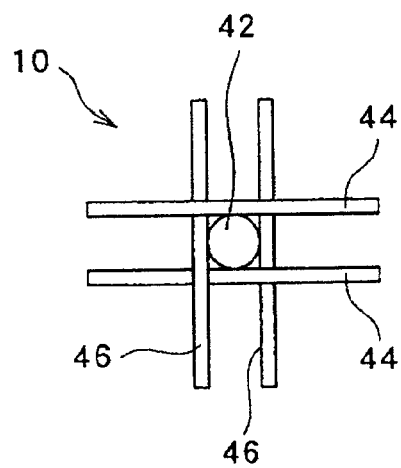
FIG. 5 is an enlarged plan view of the vibration expanding element.

In the vibration expanding element 10 shown in FIGS. 3-5, the first vibration transmitting plates 44 and the second vibration transmitting plates 46 are respectively disposed in such a manner that the vibration transmitting plates of the first, third and fifth stages as counted from above are welded to one side of the support bar 42 and the vibration transmitting plates of the second and fourth stage are welded to the opposite side of the support bar 42 for balancing the weight of one vibration expanding element 10 as a whole.

Figure 17:
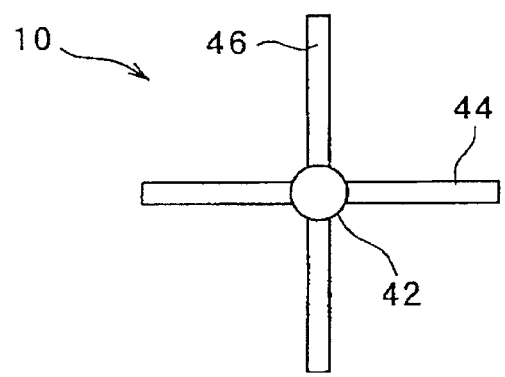
FIG. 17 is a plan view showing another example of the vibration expanding element.

The structure of the vibration expanding element 10 is not limited to the one shown in FIGS. 3-5 but it may be constructed as shown in the plan view of FIG. 17 for example, in which a first vibration transmitting plate 44 and a second vibration transmitting plate 46 are respectively divided into two plate portions and these two plate portions are welded to both sides of the support bar 42.

In this filter material vibrating means, when the vibrating element 9 connected to the power source is switched on and actuated, this vibrating element 9 is vibrated and this vibration is transmitted the first vibration transmitting plates and the second vibration transmitting plates through the frame 40 and the support bars of the vibration expanding elements 10. The vibration of these vibration transmitting plates is transmitted to the entire filter material of the upper layer 2 thereby vibrating each particle of the filter material.

According to the above described embodiment, the vibrating means comprises one or a plurality of vibrating elements 9 connected to a power source, and vibration expanding means connected to the vibrating element or elements 9 in such a manner the vibration expanding means is buried in the filter material for transmitting vibration of the vibrating element or elements to the filter material and, accordingly, even if the number of the vibrating elements 9 is small, desired degree of vibration can be transmitted to the entire filter material to vibrate each particle of the filter material. By this arrangement, as compared to a case where the entire filter material is vibrated only by the vibrating elements connected to the power source, power such as electricity can be significantly saved and this will contribute to energy saving in the water treatment work.

The vibrating means of the present invention is not limited to the above described structure but a plurality of vibrating elements in the shape of a bar connected to a power source may be disposed at a proper interval in the filter material in a manner to extend in the vertical direction for vibrating the filter material. The above described embodiment, however, is more advantageous in respect of energy saving and therefore is preferable.

According to the above described embodiment of the invention, since the first vibration transmitting plates 44 and the second vibration transmitting plates 46 of the vibration expanding element 10 are respectively provided with a predetermined interval in the vertical direction of the filter layer, water to be treated can flow freely in the lateral direction through the intervals between the vibration transmitting plates during the filtering operation whereby deviation in the flow does not occur and uniform filtering operation can be achieved.

Figure 6:
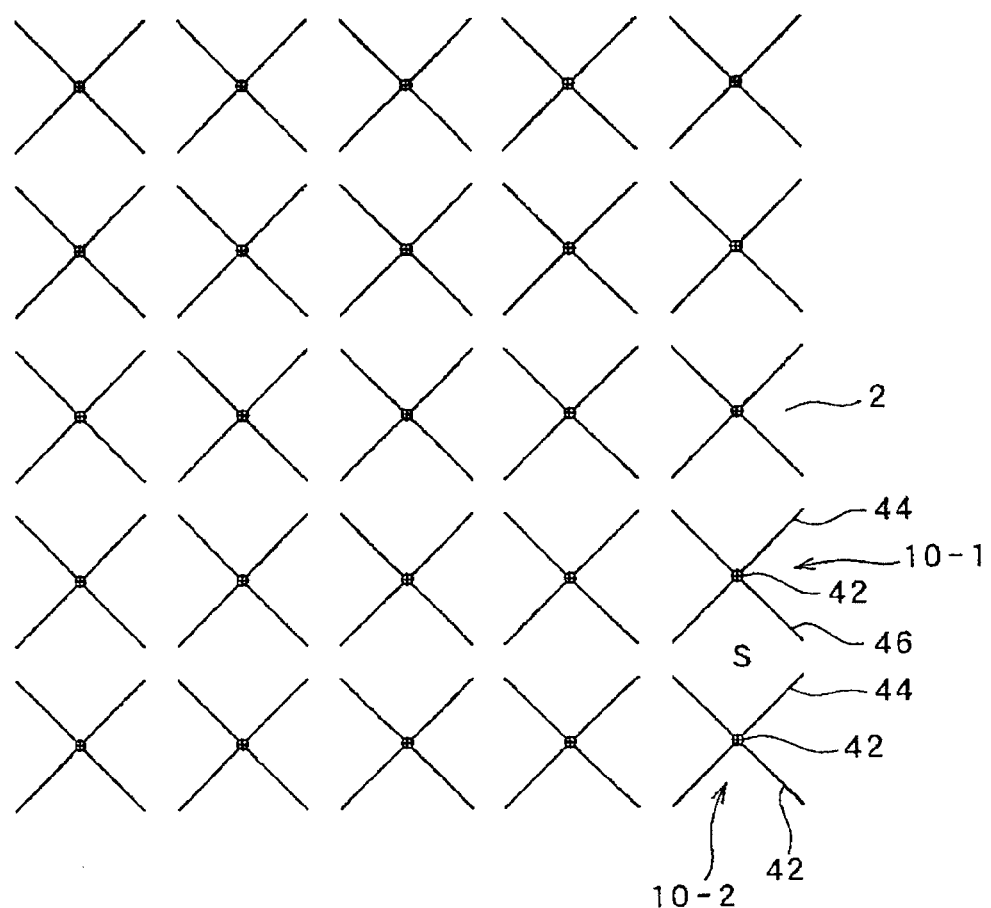
FIG. 6 is a plan view showing an example of arrangement of the vibration expanding elements.
Figure 7:
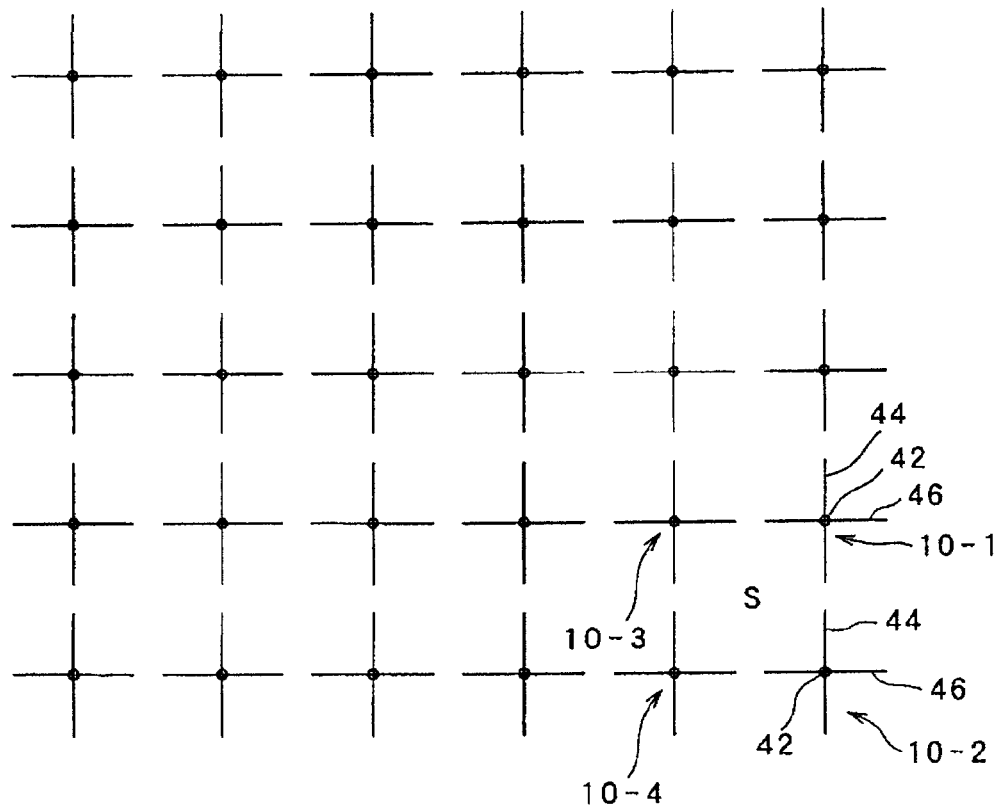
FIG. 7 is a plan view showing another example of arrangement of the vibration expanding elements.

In the above described embodiment, as shown in the plan view of FIG. 2 and the enlarged plan view of FIG. 6, a plurality of vibration expanding elements 10 are disposed in such a manner that substantially square filter surface S in a plan view is formed with adjacent two of the vibration expanding elements 10-1 and 10-2. By this arrangement, as compared to a case where a square filter surface S is formed with adjacent four vibration expanding elements 10-1, 10-2, 10-3 and 10-4 as shown in FIG. 7, the area of the square can be made smaller whereby the furthest distance between a filter material in the square S and the vibration transmitting plates 44 and 46 can be made shorter.

Figure 8:
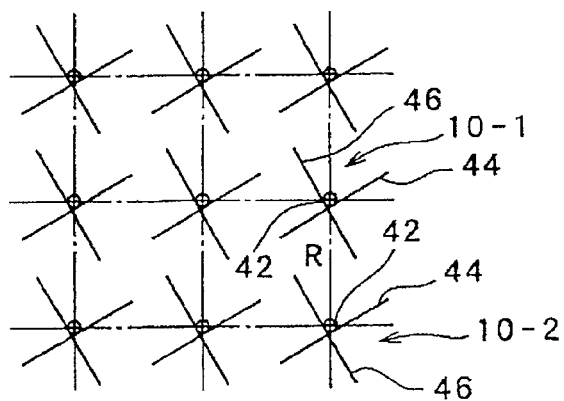
FIG. 8 is a plan view showing another example of arrangement of the vibration expanding elements.

Another embodiment of disposition of the vibration expanding elements 10 is shown in the plan view of FIG. 8. In this disposition, each of the vibration expanding elements 10 is rotated about the support bar 42 by 30 degrees in counterclockwise direction from the position shown by a chain and dot line (the same position as in FIG. 7). According to this embodiment, a substantially rectangular filter surface R in a plan view is formed with adjacent two vibration expanding elements 10-1 and 10-2 whereby furthest distance between a filter material in the rectangular filter surface R and the vibration transmitting plates 44 and 46 can be made shorter than in the case of other disposition of the vibration expanding elements.

Figure 9:
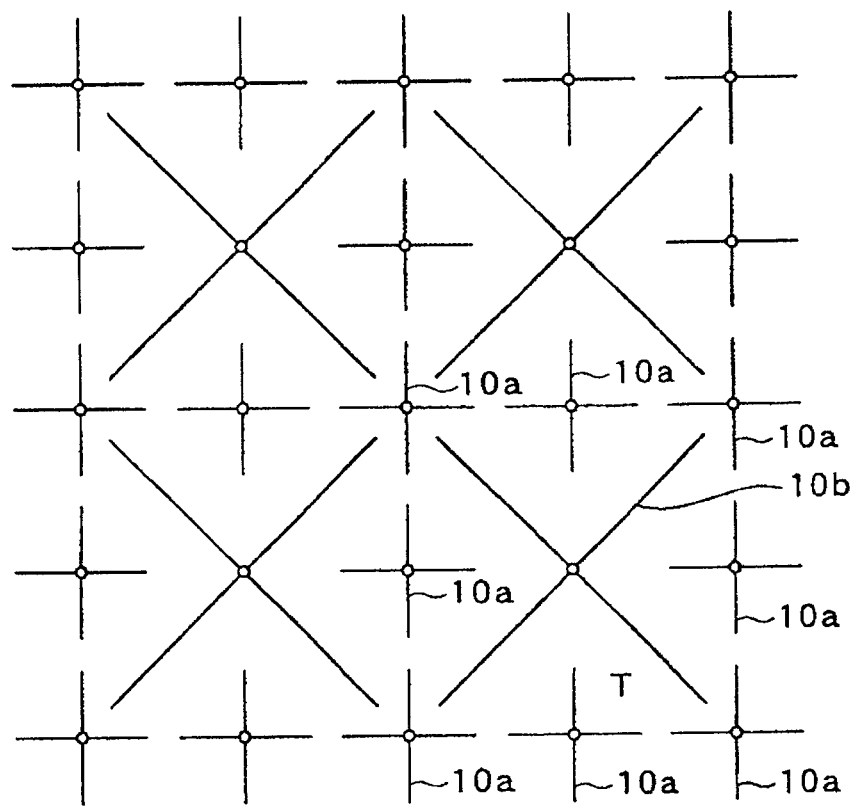
FIG. 9 is a plan view showing still another example of arrangement of the vibration expanding elements.

FIG. 9 is a plan view showing another embodiment of disposition of the vibration expanding element. In this disposition, a square is formed by disposing three vibration expanding elements 10a in horizontal direction and disposing three vibration expanding direction also in vertical direction in a plan view. In the central portion of this square, a vibration expanding element 10b which is larger than the vibration expanding element 10a is disposed so that it extends in the direction of two diagonals of the square. By this arrangement, filter material surfaces T in the shape of an isosceles triangle are formed between the vibration expanding element 10b and the surrounding vibration expanding elements 10a. By this arrangement also, furthest distance between a filter material in the filter material surface T and the vibration transmitting plates 44 and 46 can be made relatively shorter.

The structures of the vibrating element and vibration expanding means are not limited to the above described ones but various modifications can be made depending upon the size of the filter layer, structure, type and particle size of the filter material and other factors. In the case of using a frame and a plurality of vibration expanding elements as the vibration expanding means, modifications can be made in the shape of the frame, the number, shape and vertical pitch of the vibration transmitting plates o the vibration expanding element and pitch between the vibration expanding elements. In the above described embodiments, the frame and the vibration expanding elements of the vibration expanding means are made of steel and the respective component pats are fixed by welding. Alternatively, these component parts may be made of rigid plastic and fixed with an adhesive.

As the vibrating element, a vibrating element which can impart vibration of 10 Hz or over to the filter material should preferably be used. A vibrating element which can produce vibration within a range from 400 Hz to 500 Hz is particularly preferably because such vibrating element is commercially available. Since vibration created by a ultrasonic wave generator has a very short distance of arrival in the order of a few mm, such vibration cannot be used as the vibrating means in the water treatment apparatus of the invention.

Description will now be made about the operation of the water treatment apparatus of FIG. 1.

During filtering of raw filter, raw water is supplied from a water supply pump to the mixed raw water stream jet nozzles 7 through the raw water supply tube 6 while depth of water above the surface of the upper layer 2 is maintained at a predetermined value. The raw water is turned to a jet water stream by setting the flow speed of the water stream flowing through the jet nozzles 7 to, e.g., 1.5 l per minute to 3 l per minute while air is sucked into the jet nozzles 7 through the air inlet tubes 15 at a flow speed of, e.g., 0.5 l per minute to 1 l per minute. By this structure, the jet stream turns air to a multitudes of small air bubbles and the mixed raw water jet stream containing a multitudes of air bubbles is jetted out of the raw water outlets 7b of the jet nozzles 7 onto the surface of the water above the upper layer 2 bringing dissolved oxygen to a nearby saturation state. Iron in the water reacts with dissolved oxygen and is caught as iron hydroxide on the surface of the filter material. Thus, soluble substances such as iron are oxidized and become insoluble. Among the insoluble substances, iron is mainly caught on the surface of particles of the filter material such as zeolite which forms the upper layer 2 whereas manganese is mainly caught on the surface of particles of the filter material such as filtering sand which forms the lower layer 3 by activity of the microorganism which has been activated by the dissolved oxygen of high concentration. The raw water which has thus been filtered through the filter layer 4 and removed of the insoluble substances and other foreign matters is taken out of the water collecting and distributing pipe 13 which functions as the filtered water takeout tube.

As the above described filtering operation is continued, flocks of oxides and other foreign matter are accumulated in the surface portion of the upper layer 2 with lapse of time and the surface portion of the upper layer 2 is covered with the flocks and other foreign matter which block gaps between the particles of the filter material and thereby reduce the filtering function of the filter layer 4. As the surface portion of the upper layer 2 is gradually blocked, the water level of the water above the surface of the upper layer 2 is gradually raised. When the water level has reached a predetermined value, either one of the partial cleaning process or the whole cleaning process described below is selected and the selected cleaning process is carried out.

Partial Cleaning Process (1) A filter operation interruption step is carried out by suspending supply of raw water temporarily.

(2) During reverse stream cleaning, an upper layer cleaning step is carried out by causing reverse stream cleaning water to flow from the water collecting and distributing tube 13 which functions as the reverse stream cleaning water supply tube at an upper layer cleaning speed (e.g., 5-30 m/h) while switching on the vibrating elements 9 to cause vibration of the vibrating elements 9 to be transmitted to the entire filter material of the upper layer 2 by the vibration expanding mans 10 and thereby cause the filter material of the upper layer 2 to vibrate and rub together. By this vibration, iron hydroxide which has closed the upper surface of the filter material is removed from the filter material and is washed away by the upward directed stream of reverse stream cleaning water. By supplying the reverse stream cleaning water at the upper layer cleaning speed which is a relatively low speed, sludge removed by vibration of the filter material by the vibrating means is drained from the overflow outlet 12.

(3) A turbid water draining step is carried out by draining turbid water containing iron caught mainly in the upper layer 2 from the overflow outlet 12 by causing the reverse stream cleaning water to flow from the water collecting and distributing pipe 13 at the upper layer cleaning speed and cleaning the filter materials of the upper layer 2 and the lower layer 3 by the upward directed reverse stream water.

Whole Cleaning Process (1) A filter operation interruption step is carried out by suspending supply of raw water temporarily.

(2) A cleaning step is carried out by causing reverse stream cleaning water to flow from the water collecting and distributing pipe 13 at a whole layer cleaning speed (e.g., 30 m/h to 60 m/h) which is higher than the upper lawyer cleaning speed and is higher than a speed at which the filter material settles to clean the filter material of the upper layer 2 and the lower layer 3 with the high speed upward directed stream.

(3) A settling step is carried out by finishing cleaning of the filter material of the upper layer 2 and the lower layer 3 and thereby allowing the filter material of the upper layer 2 and the lower layer 3 to settle while continuing supply of the upward directed reverse stream at a speed which is lower than a speed at which the filter material settles.

(4) A turbid water draining step is carried out by draining turbid water containing substances separated from the filter material of the upper layer 2 and the lower layer 3 from the overflow outlet 12 by continuing supply of the upward directed reverse stream at the upper layer cleaning speed.

For determining which of the partial cleaning process and the whole cleaning process should be selected, frequency of the partial cleaning process and frequency of the whole cleaning process are determined in accordance with the ratio of concentration of iron and concentration of manganese and with the filtering speed and the partial cleaning process and the whole cleaning process are conducted according to the respective frequency thus determined.

Figure 10:
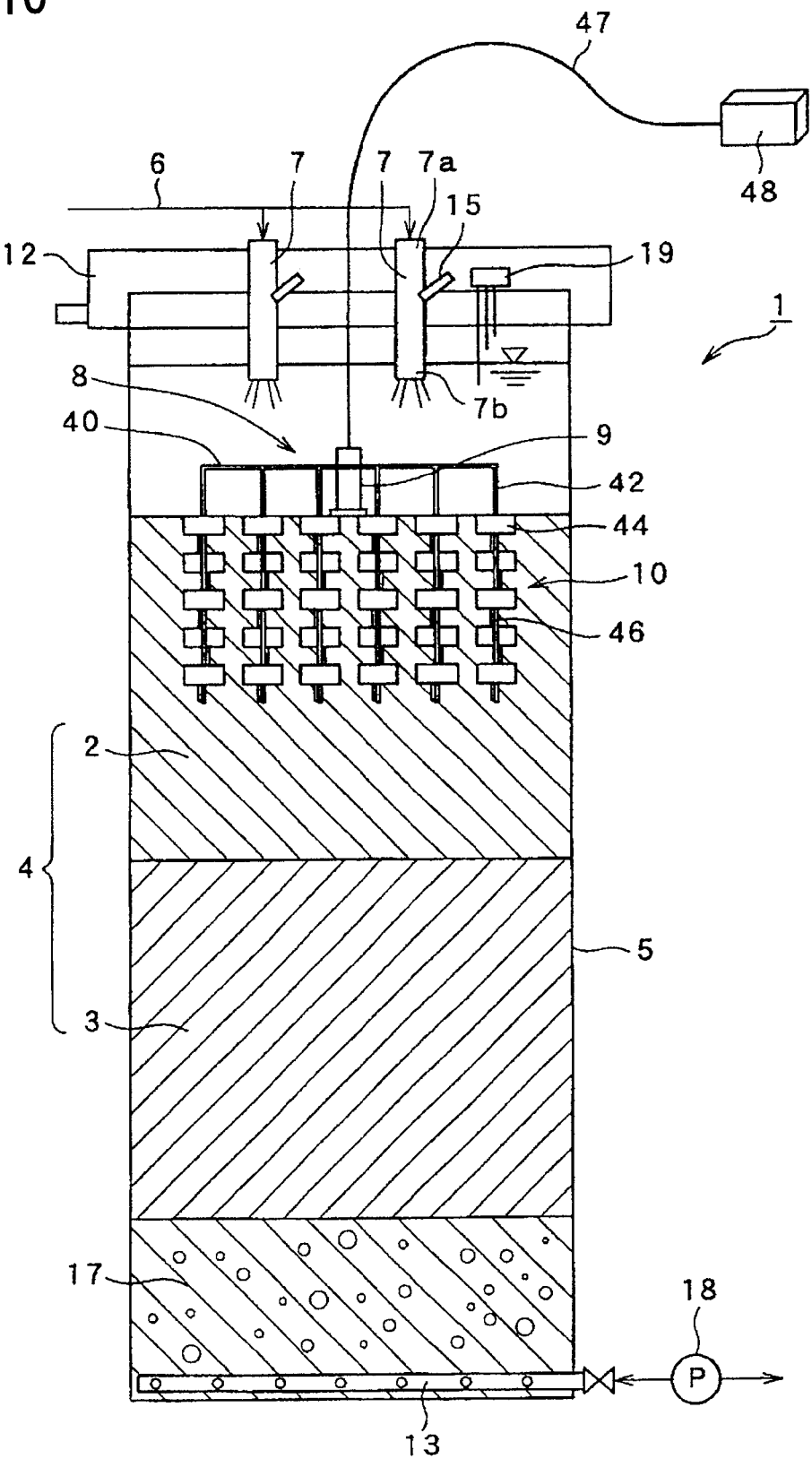
FIG. 10 is a schematic sectional view showing another embodiment of the water treatment apparatus according to the invention.

FIG. 10 is a diagram schematically showing another embodiment of the water treatment apparatus made according to the invention. In the embodiment of FIG. 10, the same component parts as those used in the embodiment of FIG. 1 are designated by the same reference characters and description thereof will be omitted.

In the embodiment of FIG. 10, a pump 18 is connected to the water collecting and distributing pipe 13 to suck and take out filtered water. In the upper portion of the filtering tank 5, a water level meter 19 is provided for measuring water level above the surface of the upper layer 2.

The pump 18 is controlled in the following manner. First, the amount of water to be treated by this pump 18 per unit time is set at a value which is somewhat larger than the amount of supply of raw water. As the filter operation is continued, the water level of the water above the upper layer 2 is gradually lowered. This water level is measured by the water level meter 19 and, when the water level has been lowered to a predetermined level, the operation of the pump 18 is temporarily suspended until the water level rises to a predetermined level. Upon rising of the water level to this level, the pump 18 is operated again and the above operation is continued repeatedly.

Conversely, the amount of water to be treated by the pump 18 per unit time may be set at a value which is somewhat smaller than the amount of supply of raw water. When the water level has risen to a predetermined level, supply of raw water is temporarily suspended until the water level is lowered to a predetermined level. Upon lowering of the water level to this level, supply of raw water is resumed and this operation is continued repeatedly.

In another embodiment of the invention, resistance value of the filtering tank 5 during normal filter operation is measured and, when this resistance value has exceeded a predetermined value, the partial cleaning process is started. For measuring the resistance value, differential pressure of the filtering tank 5 may be measured by a differential pressure meter or, alternatively, when the water level measured by a water level meter has reached a predetermined value, this water level may be regarded to be a predetermined resistance value. By this arrangement, when blocking has occurred in the upper layer of the filter layer to the extent that cleaning is necessary, the partial cleaning process is started automatically and, accordingly, the partial cleaning process can be performed more efficiently than in the case where the partial cleaning process is performed according to a predetermined schedule.

As another way of cleaning, the partial cleaning process is performed when the resistance value of the filtering tank 5 has reached a predetermined value (it may be performed automatically or the predetermined time may be measured from time to time) and, when time elapsed from finishing of the partial cleaning process till a time point at which the resistance value of the filtering tank has reached a predetermined value becomes less than a predetermined period of time, the whole cleaning process is automatically started.

Figure 11:
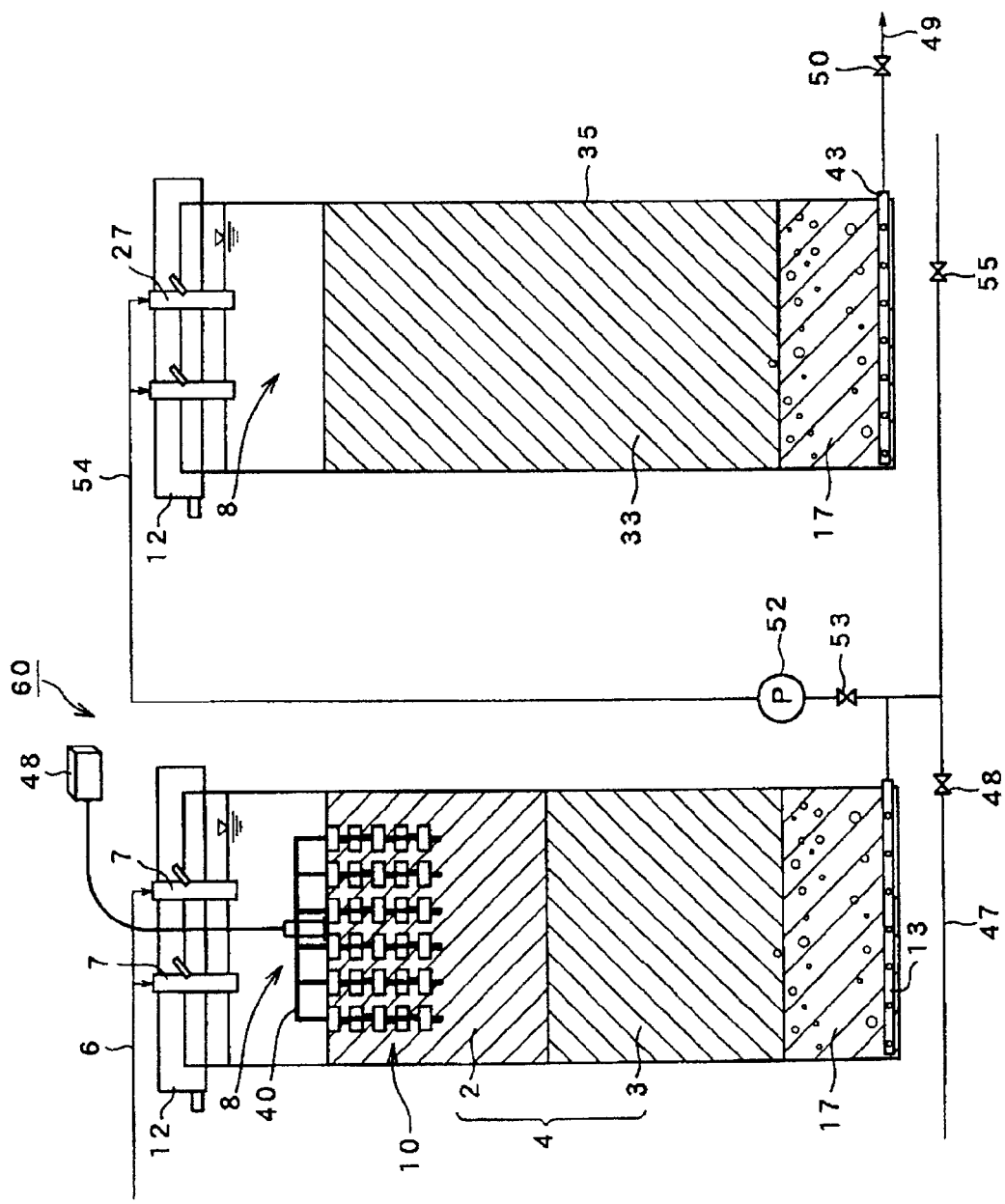
FIG. 11 is a schematic sectional view showing another embodiment of the water treatment apparatus according to the invention.
Figure 15:
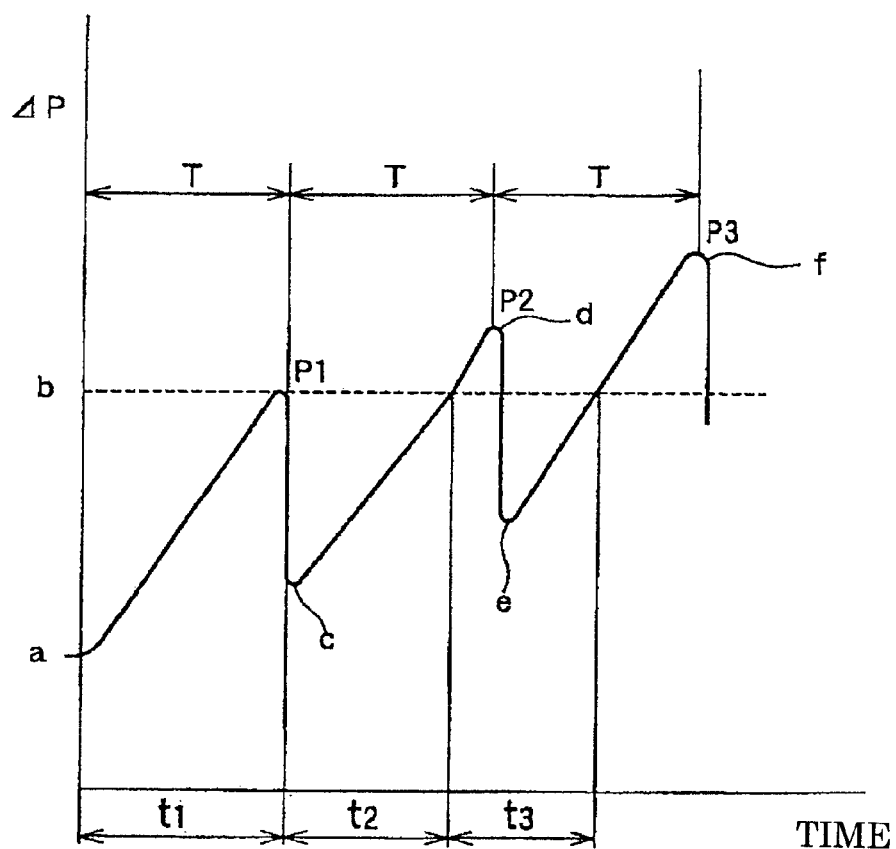
FIG. 15 is a graph showing relationship between time and resistance value of the filter tank when the partial cleaning process is conducted each time when a set period of time has elapsed.

FIG. 15 is a graph which shows relationship between time and resistance value (differential pressure value) $\Delta p$ of the filtering tank in which the horizontal axis shows time and vertical axis shows resistance value. The curve shows change of the resistance value $\Delta p$ in a case where a partial cleaning process is performed at a constant time interval T. In FIG. 11, if, in each partial cleaning process, time required for the resistance value $\Delta p$ to reach a predetermined value b is counted, this time changes as follows: Assuming that initial resistance value at start of the filter operation is a, resistance value at initial partial cleaning process P1 is the predetermined value b and time elapsed till reaching of the predetermined resistance value is t1, the resistance value drops to c by the initial partial cleaning process P1. Since, however, the resistance value does not drop to the initial value a, time t2 which is elapsed till reaching of the resistance value to the predetermined value b by next filter operation is shorter than t1. The resistance value drops to e by the second partial cleaning process P2 but this resistance value is higher than c. Time t3 which is elapsed till reaching of the resistance value to the predetermined value b by next filter operation is shorter than t2.

Therefore, by performing the partial cleaning process each time the resistance value has reached the predetermined value b, measuring time t1, t2 and t3 elapsed for the resistance value $\Delta p$ to reach the predetermined value b after each partial cleaning process during normal filter operation, and automatically starting the whole cleaning process when time t3 elapsed for the resistance value to become the predetermined value b after the second partial cleaning process and before the last partial cleaning process is shorter than a predetermined period of time Ta, the whole cleaning process can be effectively performed to maintain the filter layer always in a desirable stage in a simple manner by only measuring the predetermined value b.

FIG. 11 shows another embodiment of the water treatment apparatus of the invention for carrying out the method of the invention. This cleaning method is one which can remove manganese in raw water sufficiently even in a case where the concentration of manganese in raw water is so high that it is difficult to remove manganese sufficiently by the apparatus shown in FIG. 1 or 10. In the apparatus of FIG. 11, the same component parts as those of FIG. 1 are designated by the same reference characters and description thereof will be omitted.

In this water treatment apparatus 60, there is provided, on the downstream side of the water collecting and distributing pipe 13 of the apparatus of FIG. 1, a posterior stage filtering tank 35 which houses a posterior filter layer 33 consisting of the same filter material as the filter material of the lower layer 3. The posterior stage filter tank 35 comprises a filtered water outlet or outlets 27 communicating with the water collecting and distributing pipe 13 functioning as the filtered water takeout tube and opening in an upper portion of the posterior stage filtering tank 35 above the posterior stage filter layer 33, a water collecting and distributing pipe 43 functioning as a filtered water takeout tube for taking out water filtered through the posterior filter layer 33 and a reverse stream cleaning water supply tube for supplying reverse stream cleaning water to the posterior filter layer 33, and an overflow outlet 12 consisting of an overflow trough or hole etc. provided in the posterior filtering tank 35 above the posterior filter layer 33. Since the structure of the filtered water outlets 27 is the same as the mixed raw water stream jet nozzles 7, description thereof will be omitted. The water collecting and distributing pipes 13 and 43 are connected to a reverse water stream cleaning water supply tube 47 and opening and closing valves 48 and 55 are provided in the reverse stream cleaning water supply tube 47. A filtered water delivering tube 49 is connected to the water collecting and distributing pipe 43 and an opening and closing valve 50 is provided in the filtered water delivering tube 49. The water collecting and distributing pipe 13 and the filtered water outlets 27 are connected to each other by a filtered water supply tube 54 and a water supply pump 52 is provided in the filtered water supply tube 54 for supplying filtered water to the posterior filter layer 33.

In the embodiments of FIG. 1 and FIG. 11, the support gravel layer 17 is used. Instead of using the support gravel layer 17, a water collecting and distributing pipe may be provided in the lower layer of the filter layer and in the bottom portion of the posterior stage filtering tank.

Figure 12A:
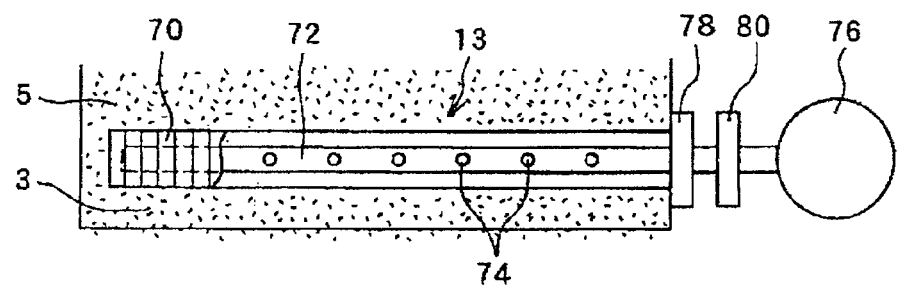
FIG. 12A is a side view and FIG. 12B is a plan view.
Figure 12B:
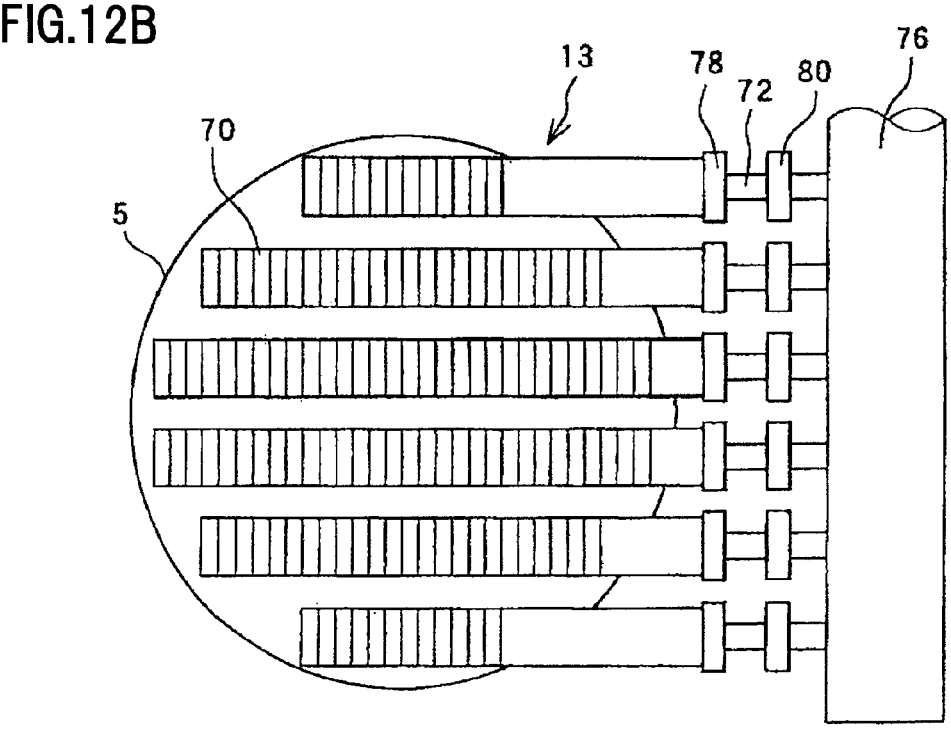

A preferred example of the water collecting and distributing pipe 13 used suitably for a filtering tank in which the support gravel layer is not used is shown in the sectional side view of FIG. 12A and the plan view of FIG. 12B. The illustrated example shows the water collecting and distributing pipe 13 but the water collecting and distributing pipe 33 is of the same construction. In this example, a plurality of the water collecting and distributing pipes 13 are disposed in parallel in the horizontal direction in the bottom portion of the filtering tank 5. Each of the pipes 13 consists of a cylindrical screen 70 which constitutes an outer cylinder and an inner perforated pipe 72 disposed in the center of the cylindrical screen 70. The inner perforated pipe 72 has water collecting and distributing holes 74 formed in the axial direction of the inner perforated pipe on both sides thereof. As the cylindrical screen 70, a cylindrical screen of a known construction in which a helical wire is wound about support rods disposed a predetermined interval in the circumferential direction. In FIG. 12A, the cylindrical screen 70 is shown with its part being removed.

The inner perforated pipe 72 is connected to the cylindrical screen 70 by means of a flange portion 80 and is connected to a water collecting and distributing main pipe 76 by means of a flange portion 80.

In the apparatus 1 of FIG. 1, in a case where the concentration of manganese in raw water is very high, manganese accumulates and forms a film in the support gravel layer 17 and thereby blocks the support gravel layer and water collecting and distributing pipe. In this case, gravels of the support gravel layer 17 and the water collecting and distributing pipe cannot be cleaned by the whole cleaning process and, therefore, the entire support gravel layer 17 and the water collecting and distributing pipe must be taken out of the filtering tank 5 for cleaning, which requires a troublesome work. In the case of using no support gravel layer but disposing the water collecting and distributing pipes 13 and 43 consisting of the cylindrical screens 70 and the inner perforated pipes 72 in the lower layer 3 of the filter layer 4 and the posterior filter layer 33, manganese accumulates in a portion about the cylindrical screens 70 even if the concentration of manganese is very high. In this case, the cylindrical screens 70 only are detached from the inner perforated pipes 72 and taken out of the filtering tank for cleaning and this can be advantageously done by a relatively simple work.

The water collecting and distributing pipes 13 can be used not only in the apparatus 60 but also in the apparatus 1 of FIG. 1. In this case, in the apparatus 1 of FIG. 1, the support gravel layer 17 is not used but the water collecting and distributing pipes 13 are disposed in the bottom portion of the lower layer 3.

For clearing the support gravel layer, if the support gravel layer is cleaned by inserting a bar-like vibrating element which is connected to a power source into the support gravel layer while supplying reverse stream cleaning water, the support gravel layer can be cleaned in a simple way without taking out the support gravel layer.

Description will now be made about operation of this water treatment apparatus 60.

During filtering, filtered water in which iron has been removed by the upper layer 2 and a substantial portion of manganese has been removed by the lower layer 3 is supplied from the water collecting and distributing pipe 13 to the posterior stage filter layer 33 via the filtered water supply pipe 54 and remaining manganese is removed by the posterior stage filter layer 33. During this period of time, the valves 48 and 55 of the reverse stream cleaning water supply tube 47 are closed and the valves 53 and 50 of the filtered water supply tubes 54 and 49 are opened.

Partial cleaning process and whole cleaning process are performed in the following manner.

Partial Cleaning Process (1) A filter operation interrupting step is carried out in which supply of raw water is temporarily suspended. At this time, the valves 48 and 55 of the reverse stream cleaning water supply tube 47 are closed and the valves 53 and 50 of the filtered water supply tubes 54 and 49 are opened.

(2) An upper layer cleaning step is carried out. In the state in which the valve 48 is opened while the valve 55 of the reverse stream cleaning water supply tube 47 remains closed and the valves 53 and 50 of the filtered water supply tubes 54 and 49 are closed, reverse stream cleaning water is supplied from the water collecting and distributing pipes 13 at the upper layer cleaning speed (e.g., 5 m/h to 30 m/h) and the vibration expanding element 10 is actuated to cause the filter material to rub together and thereby clean the filter material of the upper layer 2. This upper layer cleaning step is finished before the water level reaches the overflow outlet 12.

(3) After stirring and cleaning of the filter material of the upper layer is finished, a settling step is carried out by causing the stirred filter material of the upper layer 2 to settle to the original state.

(4) A turbid water draining step is carried out by draining turbid water containing iron components caught mainly in the upper layer from the overflow outlet 12 by cleaning the filter materials of the upper layer 2 and the lower layer 3 by supplying reverse stream cleaning water from the water collecting and distributing pipes 13 at the upper layer cleaning speed.

Whole Cleaning Process (1) A filter operation interrupting step is carried out in which supply of raw water is temporarily suspended.

(2) A cleaning step is carried out. In the state in which the valve 53 of the filtered water supply tube 54 and the valve 50 of the filtered water supply tube 49 are closed while the valves 48 and 55 of the reverse stream cleaning water supply tube 47 are opened, reverse stream cleaning water is supplied from the water collecting and distributing pipes 13 and 43 at the whole cleaning speed (e.g., 30 m/h to 60 m/h) which is higher than the upper layer cleaning speed and is higher than a speed at which the filter material settles to stir the filter material of the upper layer 2, the lower layer 3 and the filter material of the posterior filter layer 33 by the upward directed high speed stream and the vibration expanding elements 10 in the upper layer 2 of the posterior stage filter layer 33 are actuated to stir and clean the upper layer, lower layer and posterior filter layer.

(3) After stirring and cleaning of the filter materials of the upper layer, lower layer and posterior filter layer is finished, a settling step is carried out by causing the stirred filter materials of the upper layer, lower layer and posterior filter layer to settle to the original state by supplying upward directed stream at a speed which is lower than a speed at which the filter material settles.

(4) A turbid water draining step is carried out by draining turbid water containing substances caught in the upper layer, lower layer and posterior filter layer from the overflow outlet 12 by cleaning the filter materials of the upper layer, lower layer and posterior filter layer by supplying reverse stream cleaning water at the upper layer cleaning speed.

For determining which of the partial cleaning process and the whole cleaning process should be selected, frequency of the partial cleaning process and frequency of the whole cleaning process are determined in accordance with the ratio of concentration of iron and concentration of manganese and with the filtering speed and the partial cleaning process and the whole cleaning process are conducted according to the respective frequency thus determined.

Figure 13:
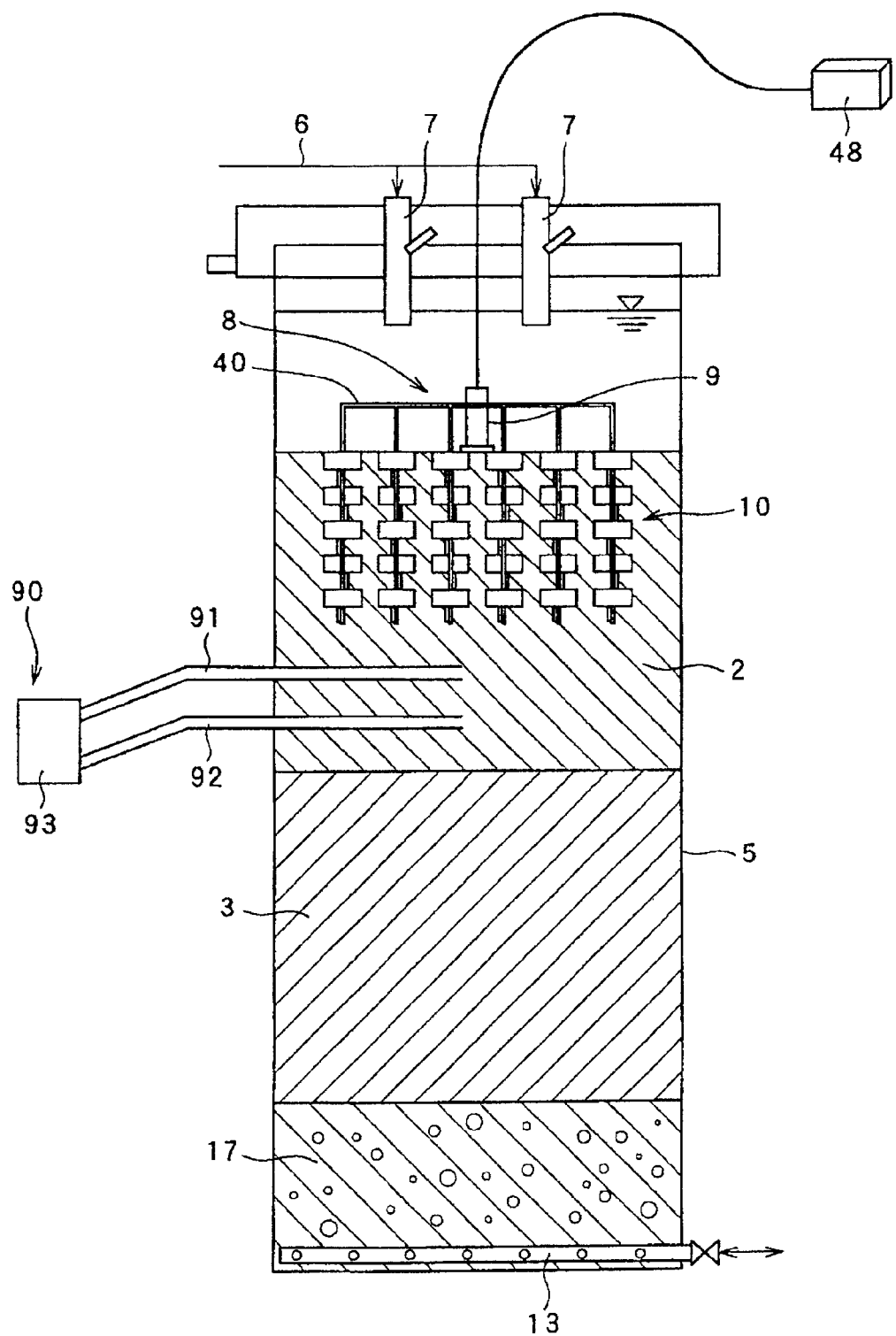
FIG. 13 is a schematic sectional view showing another embodiment of the water treatment apparatus according to the invention.
Figure 14:
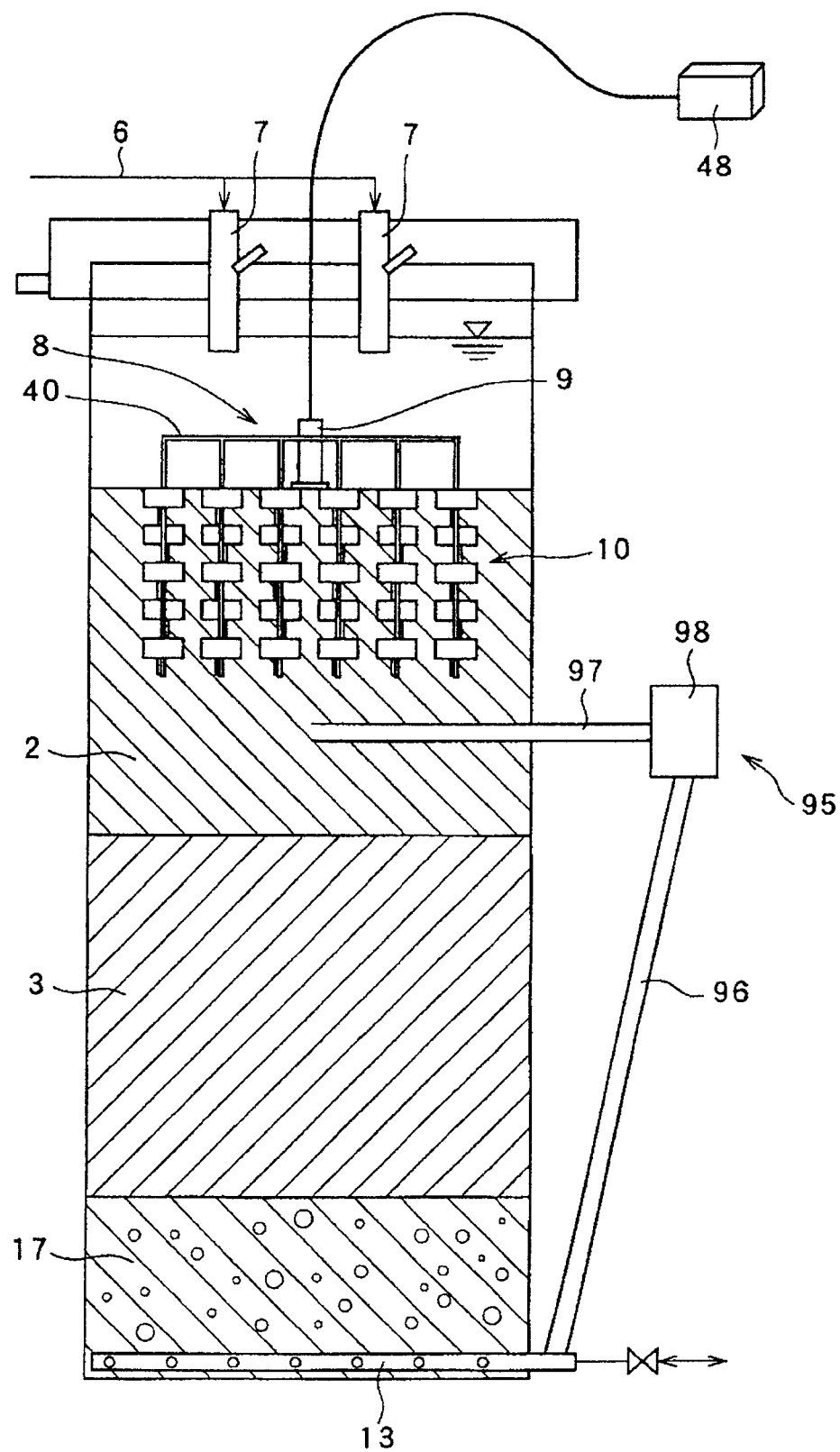
FIG. 14 is a schematic sectional view showing another embodiment of the water treatment apparatus according to the invention.

FIGS. 13 and 14 are diagrams schematically showing other embodiments of the invention.

In a case where ammoniac nitrogen is contained in a high concentration in raw water, it requires a large amount of dissolved oxygen which is more than 10 times as large as in the case of catching iron or manganese to catch and thereby remove ammoniac nitrogen. It has been found that there is a case where it is difficult to catch and remove ammoniac nitrogen sufficiently in the filter layer by only aeration caused by the mixed raw water jet stream from the mixed raw water stream jet nozzles.

For coping with such situation, in a case where raw water contains ammonic nitrogen in a high concentration, it is preferable to additionally supply dissolved oxygen to the filter layer to supplement aeration by the mixed raw water jet stream.

There are various ways for additionally supplying dissolved oxygen to the filter layer. It is an effective way to pour fine air bubbles having a diameter of several hundred μm or below into the filter layer.

FIG. 13 shows an example of this way. A dissolved oxygen supply device 90 which comprises a treated water intake tube 92 for taking in a part of treated water and a fine air bubble generation device 93 which takes in the treated water from this tube 92 and supplies a mixed stream of the treated water and fine air bubbles from a mixed stream supply tube 91 to the filter layer. As the fine air bubble generation device 93, a known device may be used. As the treated water intake tube 92 and the mixed stream supply tube 91, a tube having the same structure as the water collecting and distributing tubes 13 may be used. When the air bubble has a large diameter, the air bubble tends to stay in the filter layer and form a closed air space and this closed air space is undesirable because it reduces the water treatment area of the filter layer and thereby reduces the filtering efficiency. Since the fine air bubbles used in the present embodiment of the invention have small buoyancy and therefore have a very slow floating speed, these air bubbles are carried away by increasing flow speed of the treated water and these air bubbles reach the lower layer of the filter layer while supplying dissolved oxygen to the filter layer and are driven out of the water collecting and distributing pipe 13 without producing a closed air space in the filter layer. For this reason, in the present invention which is designed for a high speed treatment of water, pouring of fine air bubbles is a preferable method for additionally supplying dissolved oxygen. The amount of fine air bubbles to be supplied may be determined in accordance with a required amount of additional dissolved oxygen which depends upon the state of raw water such as the concentration of ammoniac nitrogen.

FIG. 14 shows another example for achieving the same purpose as FIG. 13. A dissolved oxygen supply device 95 comprises a treated water intake tube 96 which is connected to the water collecting and distributing pipe 13 in a manner to branch off from the pipe 13 to take in a part of treated water and a fine air bubble generation device 98 which takes in the treated water from this tube 96 and supplies a mixed stream of the treated water and fine air bubbles from a mixed stream supply tube 97 to the filter layer. The structures of the treated water intake tube 96 and the mixed stream supply tube 97 are the same as those of the device shown in FIG. 13.

EXAMPLE

An example of the present invention will now be described.

A water treatment operation has been conducted by using underground water as raw water and using the water treatment apparatus of FIG. 1.

As the filtering tank of the water treatment apparatus, a tank having a circular shape as viewed in a plan view and having inner diameter of 1200 mm was used. Pitch between respective vibration expanding elements 10 (i.e., length of one side of a square formed by four vibration expanding elements 10) buried in the upper layer was 150 mm. The vibration expanding elements 10 were disposed in the manner shown in FIG. 6. Length of the support bar of the vibration expanding element 10 was 640 mm.

As the vibrating element 9, one piece of a commercially available concrete vibrator was used. This vibrating element 9 was disposed in the center of the frame 40. As a power source of this vibrating element, a commercial alternating current was used. The frequency of the current was converted to 400 Hz by an inverter and vibration of the vibrating element was 200 Hz (12000 VPM).

By performing filtering, partial cleaning and whole cleaning operations by using this water treatment apparatus, filtering results shown in the following Table 1 was obtained at a filtering speed of 500 m/day.

TABLE 1

|  | concentration in raw water (mg/l) | concentration in treated water (mg/l) |
| --- | --- | --- |
| iron | 40.1 | 0.05 |
| manganese | 1.1 | 0.05 |
| ammoniac nitrogen | 1.1 | <0.05 |

As a result, it has been confirmed that sufficient filtering can be achieved at a filtering speed of 500 m/day by carrying out partial cleaning and whole cleaning by using the water treatment apparatus according to the invention.

| Description of reference characters | |
| --- | --- |
| 1, 60 | water treatment apparatus |
| 2 | upper layer |
| 3 | lower layer |
| 4 | filter layer |
| 5 | filtering tank |
| 6 | raw water supply tube |
| 7 | mixed raw water stream jet nozzle |
| 8 | vibrating means |
| 9 | vibrating element |
| 10 | vibration expanding element |
| 12 | overflow outlet |
| 13 | water collecting and distributing pipe |
| 33 | posterior stage filter layer |

The invention claimed is:
1. A method for cleaning a filter layer of a water treatment apparatus comprising a raw water supply tube, one or a plurality of mixed raw water stream jet nozzles each communicating at one end thereof with the raw water supply tube and having at the other end thereof a raw water outlet from which mixed stream of raw water and air is jetted out, a filtering tank housing a filter layer disposed below the mixed raw water stream jet nozzle or nozzles with a predetermined distance between a surface of the filter layer and the raw water outlet of the mixed raw water stream jet nozzle or nozzles, a filtered water takeout tube provided in the filtering tank for taking out water filtered through the filter layer, a reverse stream cleaning water supply tube provided in the filtering tank for supplying reverse stream cleaning water to the filter layer, a filter material vibrating means for vibrating a filter material of the filter layer, said filter material vibrating means having a portion which is buried in the filter layer, and an overflow outlet provided in the filtering tank above the filter layer,
  wherein said filter material vibrating means comprises one or a plurality of vibrating elements connected to a power source, and vibration expanding means connected to said vibrating element or elements in such a manner that said vibration expanding means is buried in the filter material for transmitting vibration of the vibrating element or elements to the filter material of the filter layer;
  said vibration expanding means comprises a frame connected to the vibrating element and a plurality of vibration expanding elements fixed to the frame, and wherein each of said vibration expanding elements comprises a support bar which extends vertically in the filter layer and is fixed at the upper end thereof to the frame, a plurality of first vibration transmitting plates which are fixed to the support bar in such a manner that the first vibration transmitting plates are disposed in parallel to one another with a predetermined interval in the vertical direction of the filter layer, and a plurality of second vibration transmitting plates which are fixed to the support bar in the interval of the first vibration transmitting plates in such a manner that the second vibration transmitting plates cross the first vibration transmitting plates and are disposed in parallel to one another; and further wherein
  the filter layer is cleaned by vibrating the filter material of the filter layer while causing the reverse stream cleaning water to flow from the reverse stream cleaning water supply tube and causing vibration of said vibrating element to be transmitted by said vibration expanding elements.

2. A method for cleaning a filter layer of a water treatment apparatus comprising a raw water supply tube, one or a plurality of mixed raw water stream jet nozzles each communicating at one end thereof with the raw water supply tube and having at the other end thereof a raw water outlet from which mixed stream of raw water and air is jetted out, a filtering tank housing a filter layer disposed below the mixed raw water stream jet nozzle or nozzles with a predetermined distance between a surface of the filter layer and the raw water outlet of the mixed raw water stream jet nozzle or nozzles, said filter layer consisting of an upper layer and a lower layer and said upper layer comprising a filter material which has a smaller specific gravity and a larger particle diameter than a filter material of said lower layer, a filtered water takeout tube provided in the filtering tank for taking out water filtered through the filter layer, a reverse stream cleaning water supply tube provided in the filtering tank for supplying reverse stream cleaning water to the filter layer, filter material vibrating means for vibrating the filter material of the upper layer, said filter material vibrating means having a portion which is buried in the upper layer, and an overflow outlet provided in the filtering tank above the filter layer,
  wherein said filter material vibrating means comprises one or a plurality of vibrating elements connected to a power source, and vibration expanding means connected to said vibrating element or elements in such a manner that said vibration expanding means is buried in the filter material for transmitting vibration of the vibrating element or elements to the filter material of the filter layer;
  said vibration expanding means comprises a frame connected to the vibrating element and a plurality of vibration expanding elements fixed to the frame, and wherein each of said vibration expanding elements comprises a support bar which extends vertically in the filter layer and is fixed at the upper end thereof to the frame, a plurality of first vibration transmitting plates which are fixed to the support bar in such a manner that the first vibration transmitting plates are disposed in parallel to one another with a predetermined interval in the vertical direction of the filter layer, and a plurality of second vibration transmitting plates which are fixed to the support bar in the interval of the first vibration transmitting plates in such a manner that the second vibration transmitting plates cross the first vibration transmitting plates and are disposed in parallel to one another; and further wherein
  the filter layer is cleaned by selectively carrying out a partial cleaning process by which the upper layer is mainly cleaned and a whole cleaning process by which both the upper layer and the lower layer are cleaned wherein said partial cleaning process comprises:
    (a) a filter operation interrupting step of suspending supply of raw water;
    (b) an upper layer cleaning step of causing reverse stream cleaning water to flow from the reverse stream cleaning water supply tube as un upward directed stream at an upper layer cleaning speed while transmitting the vibration of the vibration elements by the vibration expanding element to thereby vibrate the filter material of the upper layer to cause the filter material to rub together, thereby removing from the filter material iron hydroxide which has closed the surface of the filter material and washing away the removed iron hydroxide by the upward directed reverse stream; and
    (c) a turbid water draining step of draining turbid water containing substances separated from the filter material of the upper layer from the overflow outlet by continuing supply of the upward directed reverse stream at the upper layer cleaning speed,
  and said whole cleaning process comprises:
    (a) a filter operation interrupting step of suspending supply of raw water;
    (b) a cleaning step of causing reverse stream cleaning water to flow from the reverse stream cleaning water supply tube at a whole layer cleaning speed which is higher than the upper layer cleaning speed and is higher than a speed at which the filter material settles while actuating the filter material vibrating means to clean the filter material of the upper layer and the lower layer;
    (c) a settling step of finishing cleaning of the filter material of the upper layer and the lower layer and thereby allowing the filter material of the upper layer and the lower layer to settle while continuing supply of the upward directed reverse stream at a speed which is lower than a speed at which the filter material settles; and (d) a turbid water draining step of draining turbid water containing substances separated from the filter material of the upper layer and the lower layer from the overflow outlet by continuing supply of the upward directed reverse stream at the upper layer cleaning speed.

3. A method as defined in claim 1 further comprising a step of measuring resistance value of the filtering tank during a normal filter operation and automatically starting the partial cleaning process when the resistance value has exceeded a predetermined value.

4. A method as defined in claim 2 further comprising a step of measuring resistance value of the filtering tank during a normal filter operation and starting the partial cleaning process when the resistance value has exceeded a predetermined value and, when time elapsed from finishing of the partial cleaning process till a time point at which the resistance value of the filtering tank has reached a predetermined value becomes less than a predetermined period of time, automatically starting the whole cleaning process.

5. A water treatment apparatus comprising a raw water supply tube, one or a plurality of mixed raw water stream jet nozzles each communicating at one end thereof with the raw water supply tube and having at the other end thereof a raw water outlet from which mixed stream of raw water and air is jetted out, a filtering tank housing a filter layer disposed below the mixed raw water stream jet nozzle or nozzles with a predetermined distance between a surface of the filter layer and the raw water outlet of the mixed raw water stream jet nozzle or nozzles, a filtered water takeout tube provided in the filtering tank for taking out water filtered through the filter layer, a reverse stream cleaning water supply tube provided in the filtering tank for supplying reverse stream cleaning water to the filter layer, filter material vibrating means for vibrating filter material of the filter layer, said filter material vibrating means having a portion which is buried in the filter layer, and an overflow outlet provided in the filtering tank above the filter layer,
wherein said filter material vibrating means comprises one or a plurality of vibrating elements connected to a power source, and vibration expanding means connected to said vibrating element or elements in such a manner that said vibration expanding means is buried in the filter material for transmitting vibration of the vibrating element or elements to the filter material of the filter layer; and
said vibration expanding means comprises a frame connected to the vibrating element and a plurality of vibration expanding elements fixed to the frame, and wherein each of said vibration expanding elements comprises a support bar which extends vertically in the filter layer and is fixed at the upper end thereof to the frame, a plurality of first vibration transmitting plates which are fixed to the support bar in such a manner that the first vibration transmitting plates are disposed in parallel to one another with a predetermined interval in the vertical direction of the filter layer, and a plurality of second vibration transmitting plates which are fixed to the support bar in the interval of the first vibration transmitting plates in such a manner that the second vibration transmitting plates cross the first vibration transmitting plates and are disposed in parallel to one another.

6. A water treatment apparatus as defined in claim 5 further comprising means for supplying additional dissolved oxygen to the filter layer.

7. A water treatment apparatus comprising a raw water supply tube, one or a plurality of mixed raw water stream jet nozzles each communicating at one end thereof with the raw water supply tube and having at the other end thereof a raw water outlet from which mixed stream of raw water and air is jetted out, a filtering tank housing a filter layer disposed below the mixed raw water stream jet nozzle or nozzles with a predetermined distance between a surface of the filter layer and the raw water outlet of the mixed raw water stream jet nozzle or nozzles, said filter layer consisting of an upper layer and a lower layer and said upper layer comprising a filter material which has a smaller specific gravity and a larger particle diameter than a filter material of said lower layer, a filtered water takeout tube provided in the filtering tank for taking out water filtered through the filter layer, a reverse stream cleaning water supply tube provided in the filtering tank for supplying reverse stream cleaning water to the filter layer, filter material vibrating means for vibrating the filter material of the upper layer, said filter material vibrating means having a portion which is buried in the upper layer, and an overflow outlet provided in the filtering tank above the filter layer,
wherein said filter material vibrating means comprises one or a plurality of vibrating elements connected to a power source, and vibration expanding means connected to said vibrating element or elements in such a manner that said vibration expanding means is buried in the filter material for transmitting vibration of the vibrating element or elements to the filter material of the filter layer; and
said vibration expanding means comprises a frame connected to the vibrating element and a plurality of vibration expanding elements fixed to the frame, and wherein each of said vibration expanding elements comprises a support bar which extends vertically in the filter layer and is fixed at the upper end thereof to the frame, a plurality of first vibration transmitting plates which are fixed to the support bar in such a manner that the first vibration transmitting plates are disposed in parallel to one another with a predetermined interval in the vertical direction of the filter layer, and a plurality of second vibration transmitting plates which are fixed to the support bar in the interval of the first vibration transmitting plates in such a manner that the second vibration transmitting plates cross the first vibration transmitting plates and are disposed in parallel to one another.

8. A water treatment apparatus as defined in claim 7 further comprising a posterior stage filtering tank provided downstream of the filtered water takeout tube as viewed in the direction of taking out filtered water and housing a posterior stage filter layer comprising a filter material which is the same material as the filter material of the lower layer, said posterior stage filtering tank comprising a filtered water outlet or outlets communicating with the filtered water takeout tube and opening in an upper portion of the posterior stage filtering tank, a filtered water takeout tube for taking out water filtered through the posterior filter layer, a reverse stream cleaning water supply tube for supplying reverse stream cleaning water to the posterior filter layer, and an overflow outlet provided in the posterior filtering tank above the posterior filter layer.

9. A water treatment apparatus as defined in claim 5 wherein the filtered water takeout tube and the reverse stream cleaning water supply tube respectively consist of a plurality of water collecting and distributing pipes disposed in parallel in a bottom portion of the filtering tank and each of the water collecting and distributing pipes consists of an outer cylindrical screen and an inner perforated pipe, said inner perforated pipe having water collecting and distributing holes formed in the axial direction of the inner perforated pipe on both sides thereof.

10. A water treatment apparatus as defined in claim 5 wherein a plurality of the vibration expanding elements are disposed in such a manner that a substantially square filter surface in a plan view is formed with adjacent two of the vibration expanding elements.

11. A water treatment apparatus as defined in claim 5 wherein a plurality of the vibration expanding elements are disposed in such a manner that a substantially rectangular filter surface in a plan view is formed with adjacent two of the vibration expanding elements.

12. A method as defined in claim 2 further comprising a step of measuring resistance value of the filtering tank during a normal filter operation and automatically starting the partial cleaning process when the resistance value has exceeded a predetermined value.

13. A water treatment apparatus as defined in claim 7 wherein the filtered water takeout tube and the reverse stream cleaning water supply tube respectively consist of a plurality of water collecting and distributing pipes disposed in parallel in a bottom portion of the filtering tank and each of the water collecting and distributing pipes consists of an outer cylindrical screen and an inner perforated pipe, said inner perforated pipe having water collecting and distributing holes formed in the axial direction of the inner perforated pipe on both sides thereof.

14. A water treatment apparatus as defined in claim 7 wherein a plurality of the vibration expanding elements are disposed in such a manner that a substantially square filter surface in a plan view is formed with adjacent two of the vibration expanding elements.

15. A water treatment apparatus as defined in claim 7 wherein a plurality of the vibration expanding elements are disposed in such a manner that a substantially rectangular filter surface in a plan view is formed with adjacent two of the vibration expanding elements.

* * * * *